United States Patent
Shin et al.

(10) Patent No.: US 9,513,668 B2
(45) Date of Patent: Dec. 6, 2016

(54) MOBILE TERMINAL

(71) Applicant: LG ELECTRONICS INC., Seoul (KR)

(72) Inventors: Seungyong Shin, Seoul (KR); Inkuk Yeo, Seoul (KR); Sungkwon Jang, Seoul (KR); Kyoungtae Kim, Seoul (KR); Junghoon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 14/707,059

(22) Filed: May 8, 2015

(65) Prior Publication Data
US 2015/0331451 A1    Nov. 19, 2015

(30) Foreign Application Priority Data

| | | |
|---|---|---|
| May 14, 2014 | (KR) | 10-2014-0057918 |
| May 28, 2014 | (KR) | 10-2014-0064679 |
| Aug. 8, 2014 | (KR) | 10-2014-0102363 |

(51) Int. Cl.
*H05K 7/00* (2006.01)
*H05K 5/00* (2006.01)
(Continued)

(52) U.S. Cl.
CPC ........... *G06F 1/1637* (2013.01); *G06F 1/1626* (2013.01); *G06F 3/041* (2013.01); *G06F 3/0412* (2013.01);
(Continued)

(58) Field of Classification Search
CPC ................. H04M 1/0268; G06F 1/16
(Continued)

(56) References Cited

U.S. PATENT DOCUMENTS

D687,800 S      8/2013  Lee
2008/0223708 A1*  9/2008  Joo ............... H04M 1/0202
                                        200/600
(Continued)

FOREIGN PATENT DOCUMENTS

| | | |
|---|---|---|
| KR | 10-1998-007692 A | 3/1998 |
| KR | 10-2014-0029810 A | 3/2014 |
| KR | 10-2014-0041668 A | 4/2014 |

OTHER PUBLICATIONS

Petrovan, "Samsung Phone with Screen that Curves Around the Edges Coming This Year: AndroidAuthority," http://www.androidauthority.com/samsung-curved-edges-smartphone-344736/, XP055276619, Feb. 2014, 3 pages.
(Continued)

*Primary Examiner* — Jerry Wu
(74) *Attorney, Agent, or Firm* — Lee Hong Degerman Kang & Waimey

(57) ABSTRACT

A mobile terminal disclosed herein includes a main body having front and side surfaces, a window curved from the front surface toward the side surfaces on a top of the main body to define at least a part of the side surfaces, a touch sensor curved along a shape of the window on a rear surface of the window, a display curved along a shape of the touch sensor on a rear surface of the touch sensor, a frame provided on a rear surface of the display and having a shape corresponding to the display for support, a rear case covering a rear surface of the main body, and a decoration member located at a lower or upper end of the window, and having a main surface portion covering a part of the front surface of the main body, and curved portions each extending from the main surface portion to cover a part of each side surface of the main body.

19 Claims, 26 Drawing Sheets

(51) Int. Cl.
*G06F 1/16* (2006.01)
*G06F 3/041* (2006.01)
*H04M 1/02* (2006.01)
*H04M 1/725* (2006.01)

(52) U.S. Cl.
CPC ......... *H04M 1/0202* (2013.01); *H04M 1/0266* (2013.01); *H04M 1/0277* (2013.01); *H04M 1/0283* (2013.01); *H04M 1/72583* (2013.01); *G06F 2200/1636* (2013.01); *H04M 2201/02* (2013.01); *H04M 2201/38* (2013.01); *H04M 2250/22* (2013.01)

(58) Field of Classification Search
USPC ....................................... 361/679.21–679.37
See application file for complete search history.

(56) References Cited

U.S. PATENT DOCUMENTS

| | | | |
|---|---|---|---|
| 2013/0063891 A1* | 3/2013 | Martisauskas | G06F 1/1643 361/679.56 |
| 2013/0178248 A1 | 7/2013 | Kim | |
| 2014/0104762 A1 | 4/2014 | Park | |

OTHER PUBLICATIONS

European Patent Office Application Serial No. 16000865.2, Search Report dated Jun. 9, 2016, 11 pages.
European Patent Office Application Serial No. 16000864.5, Search Report dated Jun. 10, 2016, 12 pages.
Korean Office Action for Application 10-2014-0112537 dated Sep. 17, 2015.

\* cited by examiner

MOBILE TERMINAL

CROSS-REFERENCE TO RELATED APPLICATION(S)

This application claims the benefit of priorities of Korean Patent Application No. 10-2014-0057918, filed on May 14, 2014, and 10-2014-0064679, filed on May 28, 2014, and 10-2014-0102363 filed on Aug. 8, 2014, which are herein expressly incorporated by reference in their entireties.

BACKGROUND

1. Field

This specification relates to a mobile terminal having a display and a touch sensor.

2. Background

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal. For example, a user interface environment is provided in order for users to easily and conveniently retrieve or select functions.

Also, many users have their mobile terminals to express their own personalities, and accordingly, various design factors are required for the mobile terminals. The design factors may include structural changes and improvements for users to use the mobile terminal more conveniently. As one of those structural changes and improvements, a structure which allows side surfaces as well as a front surface of a terminal to be touch-sensitive and is easily fabricated may be taken into account.

The above references are incorporated by reference herein where appropriate for appropriate teachings of additional or alternative details, features and/or technical background.

SUMMARY OF THE DISCLOSURE

Therefore, an aspect of the detailed description is to provide a mobile terminal having a novel structure, different from the related art, and capable of being touch-sensitive on front and side surfaces thereof.

Another aspect of the detailed description is to provide a mobile terminal capable of implementing side surfaces to be touch-sensitive and minimizing a size of a bezel.

Another aspect of the detailed description is to provide a mobile terminal capable of having size-reduced upper and lower bezels.

To achieve these and other advantages and in accordance with the purpose of this specification, as embodied and broadly described herein, there is provided a mobile terminal including a main body having a front surface and side surfaces, a window provided on a top of the main body and curved from the front surface toward the side surfaces so as to define at least a part of the side surfaces, a touch sensor provided on a rear surface of the window and curved along a shape of the window, a display provided on a rear surface of the touch sensor and curved along a shape of the touch sensor, a frame provided on a rear surface of the display and having a shape corresponding to the display to support the display, supporters configured to support ends of the window, the touch sensor and the display and partially form the side surfaces of the terminal, and a rear case, configured to cover a rear surface of the main body, wherein the touch sensor and the display are formed longer along side surfaces of the window, and the window comes in contact with parts of the supporters, which are externally exposed to form the side surfaces of the terminal.

The supporters may be formed along a lengthwise direction of the mobile terminal. The frame may include a front surface portion facing the front surface of the terminal and having a flat or curved surface, and side surface portions extending from the front surface portion and curved toward the side surfaces of the terminal, respectively.

The supporters may be provided between the frame and the rear case. The supporters may be supporting members, each of which includes a vertical portion configured to support the window, and a horizontal portion configured to support the touch sensor and the display.

A through hole may be formed through the horizontal portion, and a first protrusion formed on a lower end of the frame and a second protrusion protruding from the rear case may be inserted into the through hole. The frame may be mounted on the horizontal portion.

The supporters may be mold members formed at the lower ends of the window. The frame may further include edge portions protruding from lower ends of the side surface portions in a horizontal direction. The mold members, the touch sensor and the display may be mounted on the edge portions.

Third protrusions, which come in contact with inner sides of the side surface portions of the frame, respectively, may be formed on edges of an upper surface of the rear case Each of the supporters may include a recess portion integrally formed with the frame, extending from the side surface portion and recessed in a lengthwise direction, and a protruding portion extending from the recess portion and protruding toward a top to come in contact with the lower end of the window.

Fourth protrusions, which come in contact with inner sides of the side surface portions of the frame, respectively, may be formed on edges of an upper surface of the rear case. A plurality of jig holes may be formed at the side surface portions of the frame.

The supporters may extend from the rear case. The rear case may include side surface portions coming in contact with the window, accommodating portions each formed at an inner side of the side surface portion and recessed to accommodate the touch sensor and the display therein, bottom surface portions formed perpendicular to the side surface portions and higher than the side surface portions, the bottom surface portion being formed on upper and lower ends of the main body and externally exposed, and curved surface portions curved to connect the side surface portions and the bottom surface portions to each other.

The mobile terminal may further include a decoration member provided at one side of the window and mounted on the bottom surface portion and the curved surface portions. The decoration member may have the same thickness as the window. The decoration member may include a main surface portion formed toward the front surface of the terminal, and curved portions extending from the principal surface and curved to be mounted on the curved surface portions.

A curved shape of the curved portion may correspond to a curved shape of the curved surface portion. The decoration member may be provided on the touch sensor.

In accordance with one exemplary embodiment disclosed herein, there is provided a mobile terminal including a main body having a front surface and side surfaces, a display module provided on a top of the main body and curved from the front surface toward the side surfaces to define at least a part of the side surfaces of the main body, a frame provided on a rear surface of the display module and having a shape corresponding to the display module to support the display module, and a flexible printed circuit board having one end connected to a side end portion of the display module and the other end electrically connected to a printed circuit board disposed within the main body, wherein the flexible printed circuit board is connected to the printed circuit board in a manner of bypassing or penetrating through the frame.

The frame may include a front surface portion facing the front surface of the terminal and having a flat or curved surface, and side surface portions extending from the front surface portion and curved toward the side surfaces of the terminal.

The display module may include a display provided on an upper surface of the frame and curved from the front surface to the side surfaces of the main body, a touch sensor provided on an upper surface of the display and curved along the shape of the display, and a window provided on an upper surface of the touch sensor and defining an appearance of the terminal.

The mobile terminal may further include supporting members formed in a lengthwise direction of the terminal and coupled to side end portions of a rear case, covering a rear surface of the main body, so as to support the frame and the display module. The supporting members may allow for mounting thereon side end portions of the frame and the display module.

Each of the supporting members may include a vertical portion forming at least a part of an appearance of the terminal and coming in contact with the window, and a horizontal portion configured to accommodate thereon the touch sensor, the display and the frame.

An accommodation groove may be formed along the vertical portion and the horizontal portion of each supporting member, such that the flexible printed circuit board is accommodated therein.

The accommodation groove may include a first part recessed into the vertical portion, and a second part formed perpendicular to the first part and recessed into the horizontal portion.

Each of the supporting members may include a first through hole formed through the horizontal portion. A first protrusion formed on a lower end of the frame and a second protrusion protruding from the rear case may be inserted into the first through hole.

The flexible printed circuit board may include a first vertical portion accommodated in the first part and connected to an end of the display module, a horizontal portion perpendicularly extending from the first vertical portion and accommodated in the second part, a third part extending from the first horizontal portion and having at least part upwardly formed along a sidewall of the second part, and a fourth portion extending from the third part and connected to the printed circuit board.

Edge portions may protrude from lower ends of the side surface portions of the frame in a horizontal direction, respectively, such that the display module is mounted thereon.

A second through hole may be formed through each side surface portion of the frame, such that the flexible printed circuit board is inserted therethrough.

Mold members may be formed at ends of the window in a lengthwise direction of the terminal through an insert-injection molding operation.

Third protrusions may be formed on edges of an upper surface of the rear case, respectively. The third protrusion may come in contact with an inner side of the side surface portion of the frame.

The second through holes may be formed adjacent to the edge portions, respectively.

The flexible printed circuit board may include a first flexible printed circuit board connected to the touch sensor, and a second flexible printed circuit board connected to the display. The first flexible printed circuit board and the second flexible printed circuit board may have the same shape and overlap each other.

To achieve these and other advantages and in accordance with the purpose of this specification, as embodied and broadly described herein, there is provided a mobile terminal including a main body having a front surface and side surfaces, a window provided on a top of the main body and curved from the front surface toward the side surfaces so as to define at least a part of the side surfaces, a touch sensor provided on a rear surface of the window and curved along a shape of the window, a display provided on a rear surface of the touch sensor and curved along a shape of the touch sensor, a frame provided on a rear surface of the display and having a shape corresponding to the display to support the display, a rear case configured to cover a rear surface of the main body, and a decoration member located on a lower or upper end of the window, and provided with a principal surface portion covering a part of the front surface of the main body, and curved portions each extending from the principal surface portion to cover a part of each side surface of the main body, wherein the touch sensor and the display are formed longer than the window in a lengthwise direction of the main body, and cutout portions are formed by partially cutting out ends of side surfaces of the touch sensor and the display, respectively, so as to define a space where the curved portion is curved.

The touch sensor and the display may be formed along the side surfaces of the main body to be longer than the window.

The rear case may include accommodating portions formed along the side surfaces thereof to support ends of the touch sensor and the display, sidewall portions upwardly extending from end portions of the accommodating portions to come in contact with the window, a bottom surface portion formed perpendicular to the sidewall portions and higher than the sidewall portions, and curved surface portions curved to connect the sidewall portions and the bottom surface portion to each other.

The sidewall portions may be formed along a lengthwise direction of the mobile terminal.

The decoration member may be mounted on the bottom surface portion and the curved surface portions.

The frame may include a front surface portion facing the front surface of the main body and having a flat or curved surface, and side surface portions extending from the front surface portion and curved toward the side surfaces of the main body.

First hooks may be formed on the principal surface portion and first holes may be formed on the front surface portion of the frame. The first hooks may be fixedly inserted into the first holes.

Second hooks may be formed on the curved portions and second holes may be formed on the side surface portions of the frame. The second hooks may be fixedly inserted into the second holes.

Each curved portion of the decoration member may have predetermined curvatures in XY, YZ and ZX directions.

Each of the curved portions may have a shape corresponding to a curved shape of the curved surface portion.

Each of the cutout portions may be formed to correspond to the curved portion and a section from the curved portion to one point of the principal surface portion.

The decoration member may be disposed on the touch sensor.

A printed circuit board may be provided below the frame.

The rear case may include a cover portion formed at one side of the accommodating portion to cover the rear surface of the main body, and the accommodating portion may be more recessed than the cover portion.

In accordance with at least one of embodiments disclosed herein, a size of a bezel of a mobile terminal can be minimized by supporting lower end portions of a window formed at side surfaces of the terminal using supporters.

Through holes may be formed through a frame to enable firm fixing and coupling between the frame and a rear case.

A member, which already uses portions of the window located on the side surfaces of the terminal, can be utilized so as to simplify a fabricating process.

The present invention may reduce sizes of upper and lower bezels of the terminal and also enhance performance of an antenna located at a lower end by disposing a display module driving element, which is a conductive element, on a side surface of the mobile terminal.

Also, with the display module driving element disposed on the side surface of the mobile terminal, curvatures can be applied to every region of the mobile terminal in a widthwise direction of the terminal.

Also, in accordance with at least one of embodiments disclosed herein, a decoration member or the window may be configured to be curved at a lower or upper end portion of the mobile terminal, and cutout portions may be formed at a touch sensor and a display, thereby reducing a size of a lower or upper bezel.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The embodiments will be described in detail with reference to the following drawings in which like reference numerals refer to like elements wherein.

DETAILED DESCRIPTION

Figure 1A:
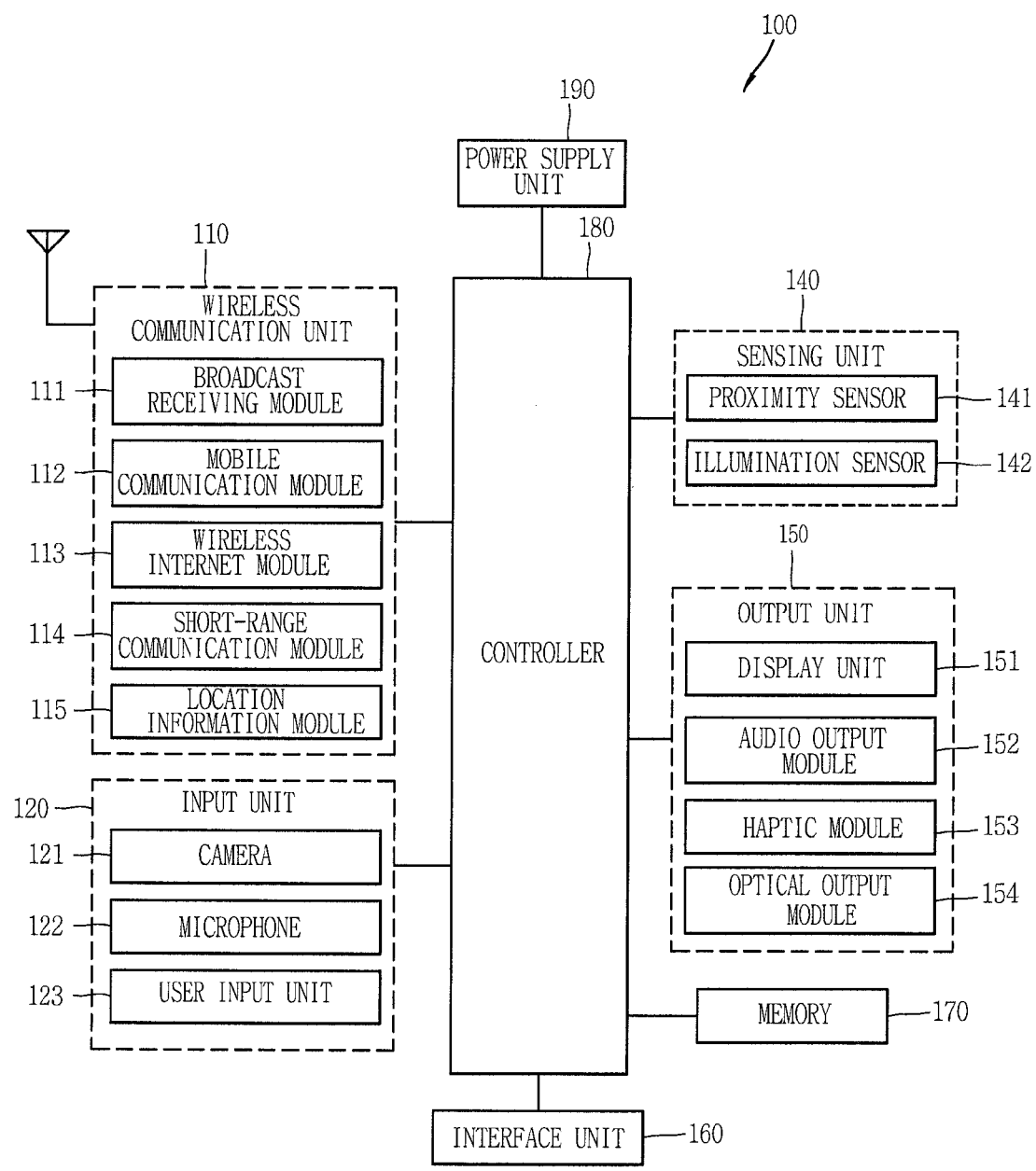
FIG. 1A is a block diagram of a mobile terminal in accordance with one exemplary embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
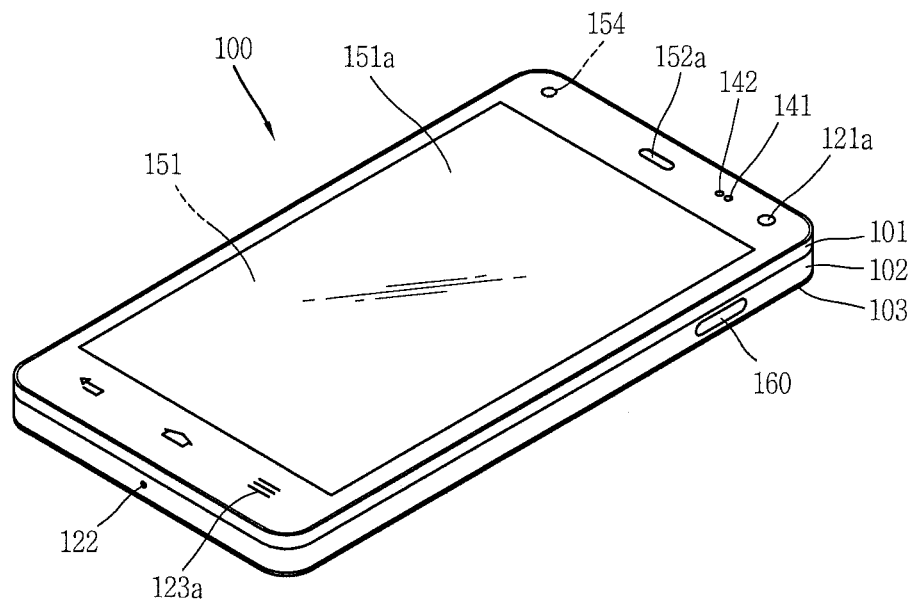
FIGS. 1B and 1C are conceptual views of one example of a mobile terminal, viewed from different directions.
Figure 1C:
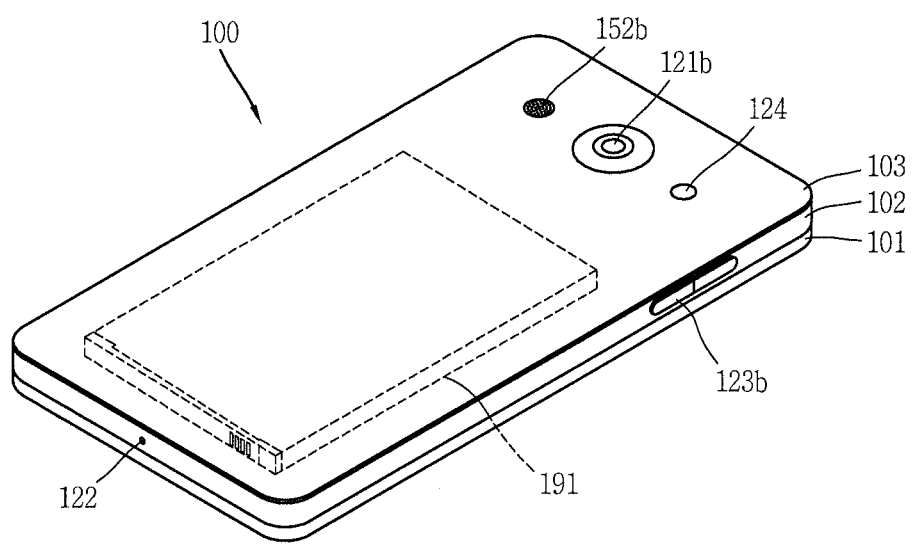

Reference is now made to FIGS. 1A-1C, where FIG. 1A is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100 as well as operations associated with the application programs. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these two devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side due to the touch screen or rear input unit replacing at least some functions of the first manipulation unit 123a provided on the front of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, description will be given of exemplary embodiments associated with a control method which can be implemented in the mobile terminal having such configuration, with reference to the accompanying drawings. It will be obvious to those skilled in the art that the present disclosure can be specified into other particular forms without departing from the spirit and essential characteristics of the present disclosure.

FIG. 2 is a conceptual view illustrating operations implemented according to the present invention.

As illustrated in FIG. 2, a display unit 251 is provided with a first region A located on a front surface of a terminal main body, and a second region B extending from the first region A and located on side surfaces of the main body. The first region A and the second region B differ from each other in a type of information displayed. The first region A and the second region B are divided according to different types of user graphic interfaces (GUIs) provided thereto, respectively.

Also, the second region B is provided with a left-sided region B1 and a right-sided region B2 located at left and right side surfaces of the terminal, respectively. The second region B has a left-right symmetric structure based on the first region A.

Figure 2A:
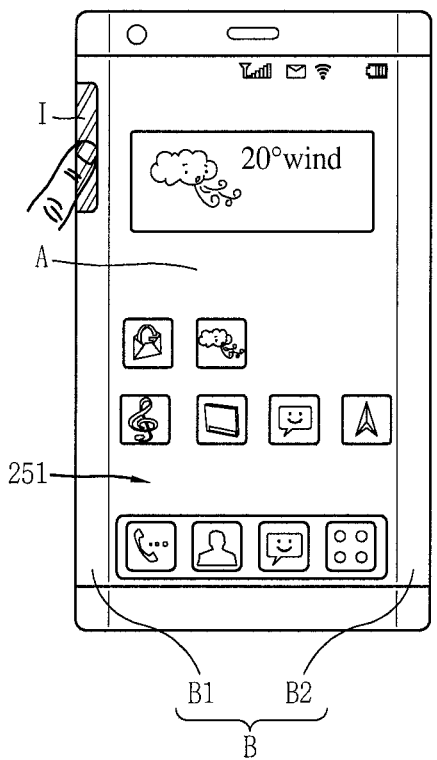
FIGS. 2A and 2B are conceptual views illustrating operations implemented according to the present invention.

Referring to FIG. 2A, a home screen page may be output on the display unit 251 of the mobile terminal. The home screen page may include at least one object. The object may be an icon of an application installed in the mobile terminal or a widget. Here, the home screen page may be output over the first and second regions A and B, but the present invention may not be limited to this. For example, the home screen page may be output only on the first region A, and the second region may be a target area to which a touch input is applied without an output of information.

Figure 2B:
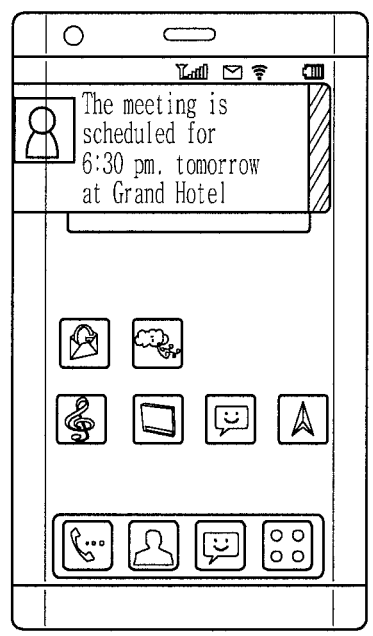

Referring to FIG. 2B, the controller senses a touch input when the touch input is applied to the second region B, and executes a control operation associated with the touch input. In this example, when a touch input is applied to a notification icon I notifying an event generation, information related to the event is output on the first region A.

Such operations associated with the touch onto the side surfaces should be supported by hardware. Hereinafter, the hardware configuration of the terminal performing the operations of FIG. 2 will be described in more detail. The present invention also provides a structure of implementing the operations in hardware as well as implementing a larger screen by reducing a size of bezel.

Figure 3A:
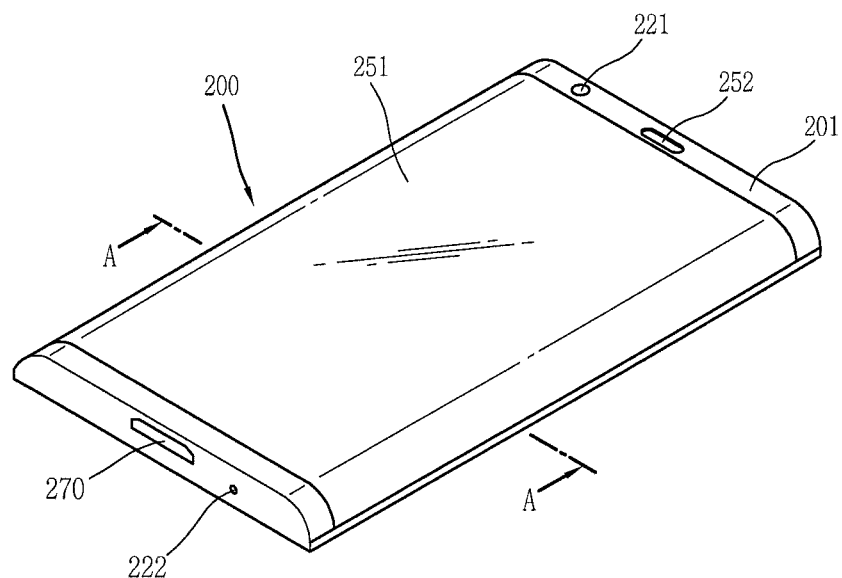
FIG. 3A is a front perspective view illustrating one example of a mobile terminal in accordance with the present invention.
Figure 3B:
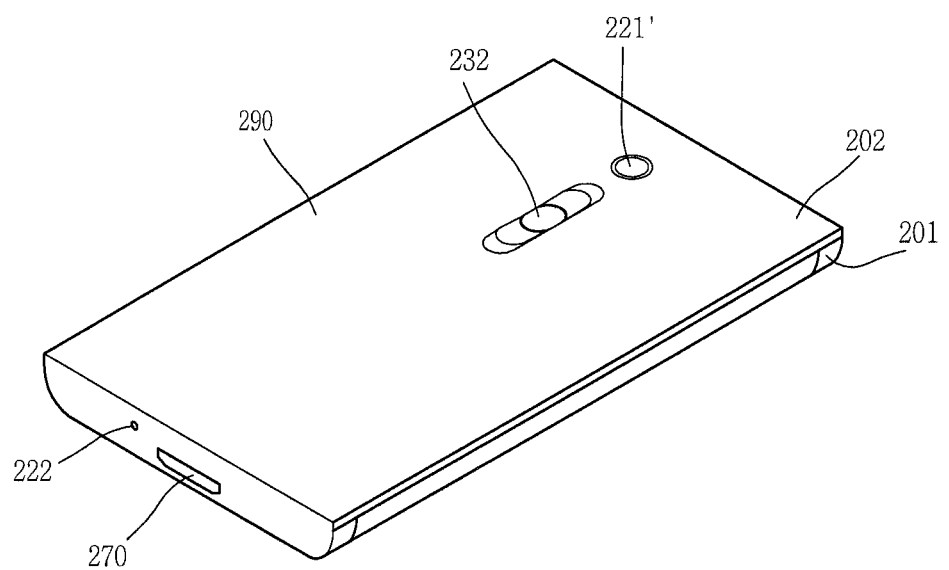
FIG. 3B is a rear perspective view of the mobile terminal illustrated in FIG. 3A.

FIG. 3A is a front perspective view illustrating one example of a mobile terminal in accordance with the present invention, and FIG. 3B is a rear perspective view of the mobile terminal illustrated in FIG. 3A.

A mobile terminal 200 is described with reference to a bar-type terminal body. However, the mobile terminal 200 may alternatively be implemented in any of a variety of different configurations. Examples of such configurations include slide-type, folder-type, swing-type, and swivel-type in which two and more bodies are combined with each other in a relatively movable manner, and combinations thereof.

The mobile terminal 200 generally includes a case (for example, frame, housing, cover, and the like) forming the appearance of the terminal. In this embodiment, the case may be divided into a front case 201 and a rear case 202 (see FIGS. 3A and 3B). Various electronic components are incorporated into a space formed between the front case 201 and the rear case 202. At least one middle case may be additionally positioned between the front case 201 and the rear case 202.

The terminal body, generally the front case 201 is shown having a display unit 251, an audio output module 252, a camera module 221 and the like. An interface 270 and the like may be disposed on side surfaces of the front case 201 and the rear case 202.

The display unit 251 occupies most of a main surface of the front case 201. That is, the display unit 251 is disposed on the front surface of the terminal to display visual information. The display unit 251 disclosed herein is configured in the form of extending up to another surface of the terminal in addition to the front surface of the terminal. In more detail, the display unit 251 is provided with a first region A located on the front surface, and a second region B (see FIG. 2) extending from the first region A and located on the side surfaces of the main body.

For example, a window which is disposed on an upper surface of the display unit 251 is configured in a manner that both side surfaces thereof are curved. Accordingly, the appearance of the front surface and the side surface of the terminal body is defined by the window. Therefore, the first region 261 and the second region 262 may be connected without a physical boundary therebetween. Here, the display unit 251 may be provided with a display device which is formed in a curved shape and embedded to correspond to the window.

As another example, the display unit 251 may be a flexible display. The flexible display refers to a display which is curved, bent, twisted, folded, or rolled by an external force. Here, the flexible display unit may include both a general flexible display and an electronic paper.

The typical flexible display is generally formed as a lightweight, non-fragile display, which still exhibits characteristics of a conventional flat panel display, but is instead fabricated on a thin flexible substrate which can be curved, bent, folded, or rolled, like a paper.

The term e-paper refers to a display technology employing the characteristic of a general ink, and is different from the conventional flat panel display in view of using reflected light. E-paper is generally understood as changing pictures or text using a twist ball or via electrophoresis using a capsule.

According to the characteristic of the flexible material, a terminal main body in which both side surfaces of the display unit are curved may be configured.

The audio output module 252 and the camera module 221 may be disposed on a region adjacent to one of both end portions of the display unit 251, and a front input unit (not illustrated) and a microphone 222 may be disposed on a region adjacent to the other end portion.

The front input unit is an example of a user input unit 230 (see FIG. 1), which may include a plurality of manipulation units. The manipulation units may be referred to as a manipulating portion, and may employ any tactile method that allows the user to perform manipulation with applying a tactile feeling.

Also, the display unit 251 may form a touch screen along with a touch sensor, and in this case, the touch screen may be a user input unit. This may allow for employing a configuration without a front input unit on the front surface of the terminal. That is, the first region 252 may be the only one input unit located on the front surface of the terminal.

Referring to FIG. 3B, the rear surface of the terminal body, namely, the rear case 202 may be further provided with a camera module 221'. The camera module 221' may have an image capturing direction that is substantially opposite to the image capturing direction of the camera module 221 (see FIG. 3A), and have different pixels from the camera module 221.

For example, the camera module 221 has a smaller number of pixels to capture an image of the user's face and transmits such image to another party, and the camera module 221' has a larger number of pixels to capture an image of a general object and not immediately transmits it in most cases. The first and the second camera modules 221 and 221' may be installed on the terminal body such that they can be rotatable or popped up.

A flash and a mirror may be additionally disposed adjacent to the camera module 221'. When an image of a subject is captured with the camera module 221', the flash may illuminate the subject. The mirror may allow the user to see himself or herself when he or she wants to capture his or her own image (i.e., self-image capturing) by using the camera module 221'.

An audio output unit (not illustrated) may be further disposed on the rear surface of the terminal body. The rear audio output module may implement stereophonic sound functions in conjunction with the front audio output module 252 (refer to FIG. 3A), and may be also used for implementing a speaker phone mode for call communication.

That is, the front audio output module 252 (first audio output module) configured as a receiver may be located on the front surface of the terminal, and the second audio output module configured as a speaker may be located on the rear surface. However, the present disclosure may not be limited to this, and the second audio output module may be provided on the side surface of the terminal.

The terminal body is provided with a power supply unit for supplying power to the mobile terminal 200. The power supply unit 290 may be embedded in the terminal body or detachably coupled to an outside of the terminal body.

As illustrated, a rear input unit 232 may be disposed on the rear surface of the terminal body. The rear input unit 232, for example, may be located below the camera module 221'.

The rear input unit 232 can be manipulated by a user to provide input of a command for controlling an operation of the mobile terminal 200. The input may be used in a variety of different ways. For example, the rear input unit 232 may be manipulated by the user to input commands such as power on/off, start, end, scroll, and command such as a control of a volume level output from the audio output module 252, switching of a touch recognition mode of the display unit 251, and the like. The present disclosure, however, may not be limited to this, and the terminal may include one or both of the front input unit and the rear input unit 232.

Figure 4:
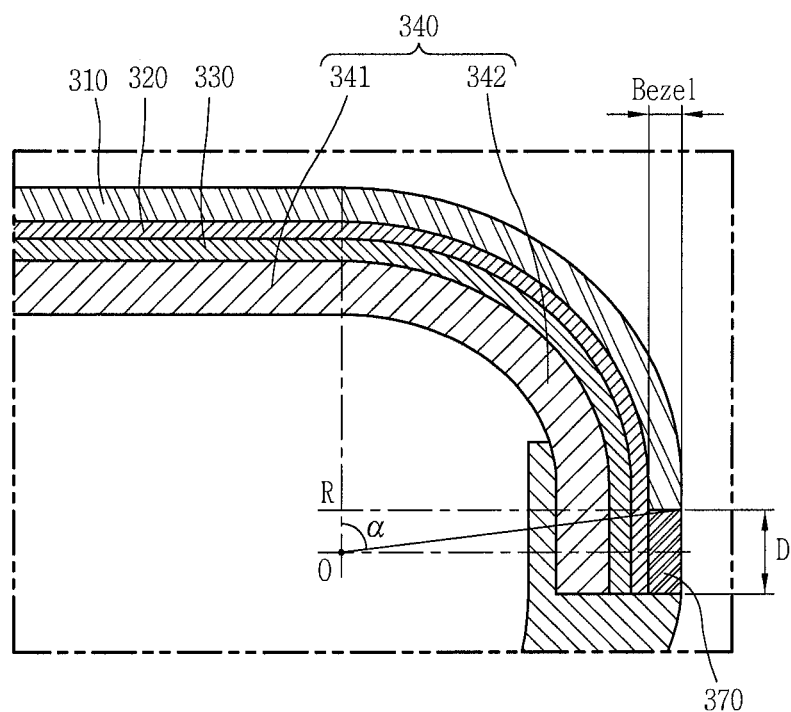
FIG. 4 is a partial sectional view of a mobile terminal having a display module.

FIG. 4 is a partial sectional view of a mobile terminal having a display module. As illustrated in FIG. 4, a display 330, a touch sensor 320 and a window 310 are provided on a frame 340. The frame, 340, the display 330, the touch sensor 320 and the window 310 may all be curved toward side surfaces of the main body. Here, a bezel by the display 330 of the mobile terminal is as thin as corresponding approximately to a thickness of the window 310.

The bezel may have the least size when the window 310 is curved (bent) by 90°, in case where the window 310 is curved with a radius of curvature R at a point 0 located within the terminal. However, there is a case where the window 310 fails to be curved by 90° due to a process problem. That is, there is a case where an angle α illustrated in FIG. 4 is smaller than 90°.

For example, when curved by 90°, the window 310 is likely to be broken. As such, if the window 310 fails to be curved by 90°, the window 310 should first be curved as much as possible and then the rest portion, namely, a portion corresponding to D in FIG. 4 should be formed by using another member, other than the window 310. Even in this instance, glass may also be used but there is still a problem that the glass has to be bonded to the window 310. Therefore, one embodiment disclosed herein will be given limitedly of an example using another member, other than the glass. Here, the portion D may correspond to a side bezel where any image is not displayed when the mobile terminal is viewed in a lateral direction, but the side bezel has no relationship to a bezel when the mobile terminal is viewed in a front direction. So, detailed description will be omitted.

Figure 5:
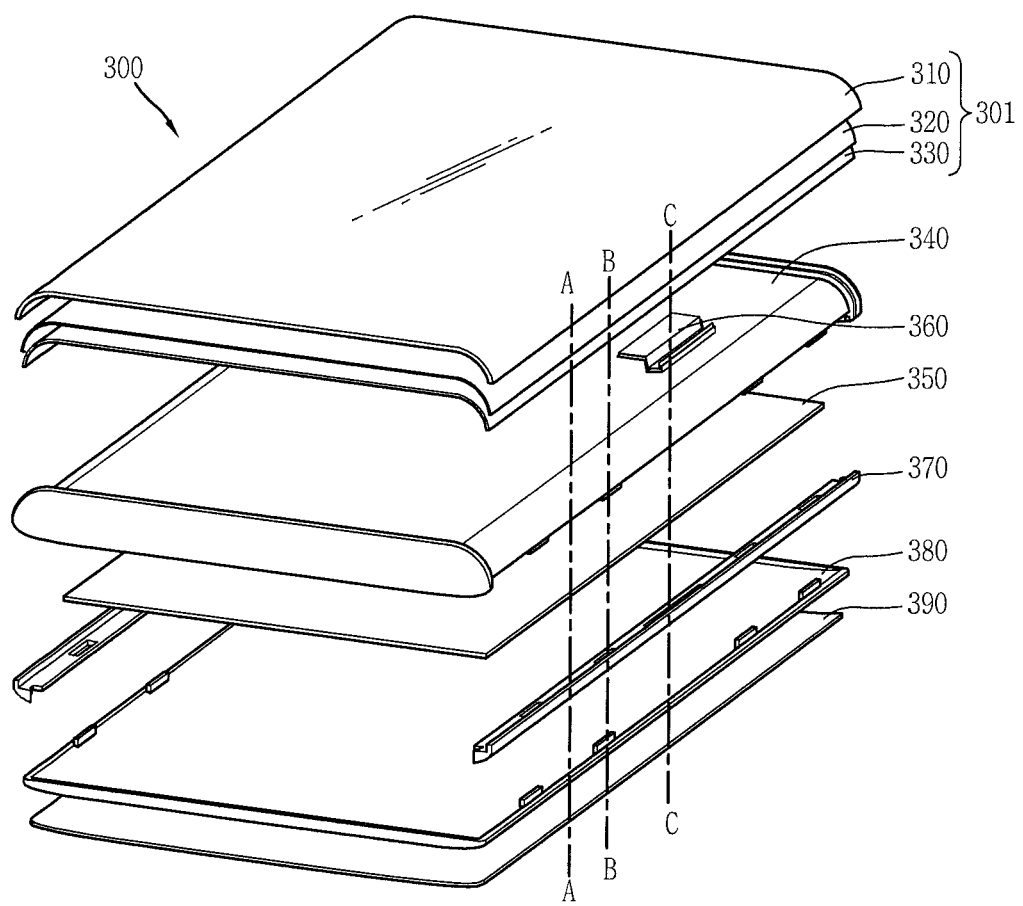
FIG. 5 is an exploded perspective view of a mobile terminal in accordance with a first exemplary embodiment disclosed herein.

FIG. 5 is an exploded perspective view of a mobile terminal 300 in accordance with a first exemplary embodiment disclosed herein, FIG. 6 is a partially-exploded perspective view of FIG. 5, and FIG. 7 is a sectional view taken along the lines AA, BB and CC of FIG. 5. Hereinafter, the first exemplary embodiment disclosed herein will be described with reference to FIGS. 5 to 7.

A mobile terminal 300 in accordance with a first exemplary embodiment disclosed herein may include a main body having front and side surfaces, a window 310 disposed on a top of the main body and curved (or bent) from the front surface to one point of each side surface so as to define at least part of each side surface, a touch sensor 320 disposed on a rear surface of the window 310 and curved along the shape of the window 310, a display 330 disposed on a rear surface of the touch sensor 320 and curved along the shape of the touch sensor 320, a frame 340 disposed on a rear surface of the display 330 and having a shape corresponding to the display 330 to support the display 330, and supporters to support ends of the window 310, the touch sensor 320 and the display 330. Also, a rear surface of the main body is covered with a rear case 380.

Here, the touch sensor 320 and the display 330, as illustrated in FIG. 7, are longer or wider than the window 310 by an externally-exposed region thereof. That is, the touch sensor 320 and the display 330 are formed longer than the window 310 by the portion D, as illustrated in a supporting member 370 of FIG. 4.

The above structure is similarly employed in second to fourth exemplary embodiments to be explained later. Specifically, the touch sensor 320 and the display unit 330 are formed longer than the window 310, such that a region longer than the display 310 can be externally exposed before the touch sensor 320 and the display 330 are coupled. Here, the window 310 which is shorter than the touch sensor 320 and the display 330 is supported by the supporter so as to be stably coupled.

The frame 340 according to the first exemplary embodiment disclosed herein, as illustrated in FIG. 6, includes a front surface portion 341 facing the front surface and forming a flat or curved surface, and side surface portions 342 each extending from the front surface portion 341 and curved toward the side surface of the main body. The side surface portion 342 may be formed to be almost perpendicular to the front surface portion 341, and a curved section of the side surface portion 342, unlike the window 310, can exceed 90°.

Here, the touch sensor 320 and the display 330 are curved to correspond to a curved shape of the window 310. When the front surface portion 341 of the frame 340 is curved, the display 330, the touch sensor 320 and the window 310 are curved accordingly. A printed circuit board 350 is disposed below the frame 340 to perform a function of the controller 180.

The first exemplary embodiment includes the supporting members 370 for supporting the window 310. The supporting members 370 also support the touch sensor 320 and the display 330 as well as the window 310, and are located between the frame 340 and the rear case 380. Each of the supporting members 370 includes a vertical portion 371 that is located below the window 310 to come in contact with a lower end portion of the window 310 for support, and a horizontal portion 372 which is formed perpendicular to the vertical portion 371 to support the touch sensor 320 and the display 330. The horizontal portion 372 may be provided with a plurality of through holes 373 which face a top. Each of the through holes 373 is configured such that both of a first protrusion 343 protruding from a lower end of the frame 340 and a second protrusion 381 protruding from an edge of the upper surface of the rear case 380 are inserted therein.

In such a manner, the frame 340 and the rear case 380 may be engaged with the supporting members 370 in a manner that the first protrusion 343 and the second protrusion 381 are simultaneously inserted into one through hole 373 and are fixed in a closely-adhered state. FIG. 7B illustrates that the first protrusion 343 is formed more outside and the second protrusion 381 is formed more inside, but the present invention may not be limited to this. The first protrusion 343 may also be formed more inside.

Figure 7A:
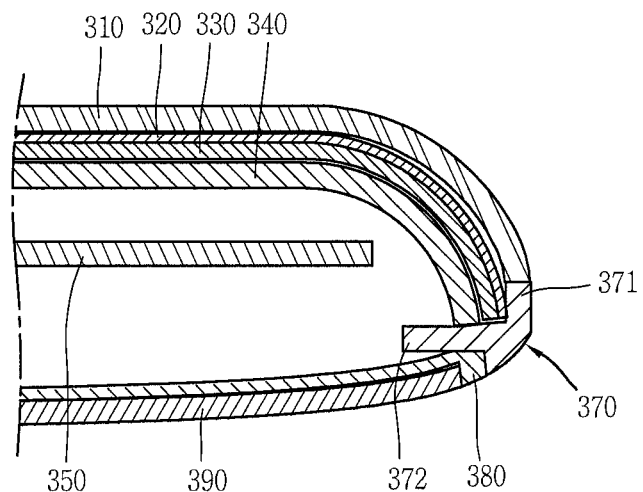
FIGS. 7A through 7C are sectional views taken along the lines AA, BB and CC of FIG. 5.
Figure 7B:
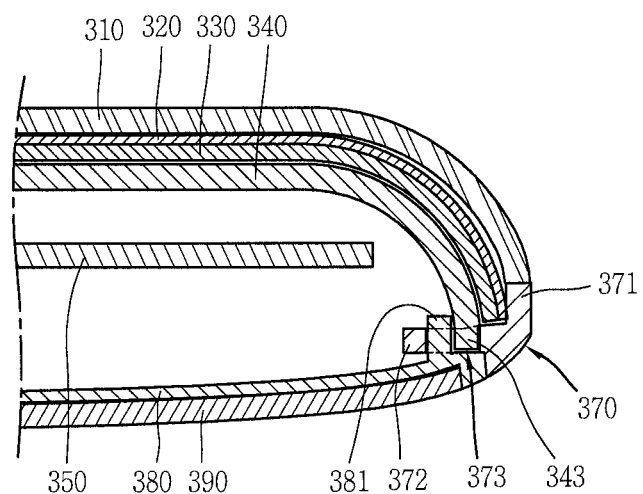

FIG. 7A illustrates that the vertical portion 371 of the supporting member 370 comes in contact with the window 310, and the touch sensor 320, the display unit 330 and the frame 340 are mounted on the horizontal portion 372. FIG. 7B illustrates that the first protrusion 343 formed on the lower end of the frame 340 and the second protrusion 381 protruding from the upper surface of the rear case 380 are inserted into the through hole 373. The first protrusion 343 is formed to have the same height as the through hole 373 formed at the horizontal portion 372.

Here, the supporting member 370 partially defines the appearance of the mobile terminal 300. Thus, the supporting member 370 may have a smoothly curved surface from a portion contacting the window 310 to a portion contacting the rear case 380. That is, that the vertical portion 371 and the horizontal portion 372 are perpendicular to each other merely indicates that portions thereof forming a space for mounting the touch sensor 320, the display 330 and the frame 340 are approximately perpendicular to each other, but does not indicate that the entire supporting member 370 is exactly formed in the perpendicular shape.

Here, a portion which is formed longer than the display 330 in FIG. 7B corresponds to the first protrusion 343. Also, a battery 390 is disposed beneath the rear case 380 to cover the rear surface of the main body. This will be equally applied to battery covers 490 and 590 according to the second and third exemplary embodiments to be explained later.

Here, the window 310, the touch sensor 320 and the display 330 may be integrally formed into a single display module 301.

Figure 8:
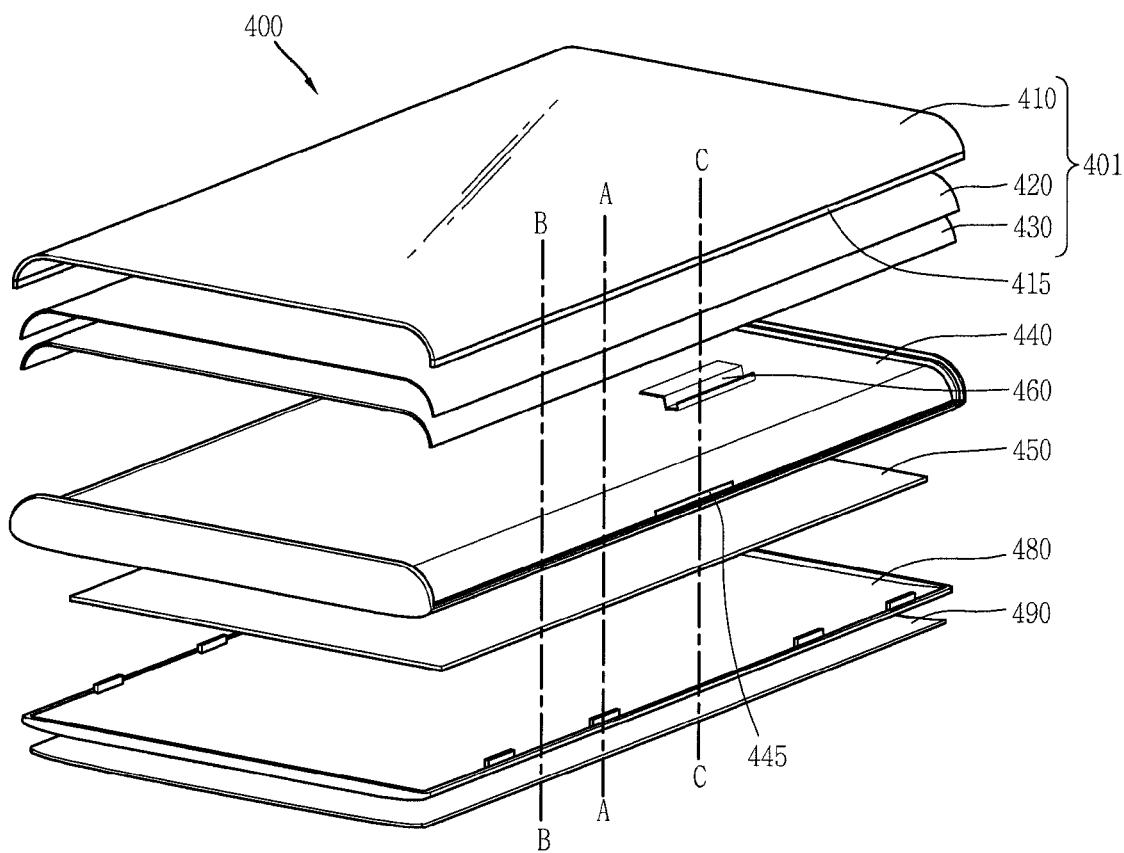
FIG. 8 is an exploded perspective view of a mobile terminal in accordance with a second exemplary embodiment disclosed herein.
Figure 9:
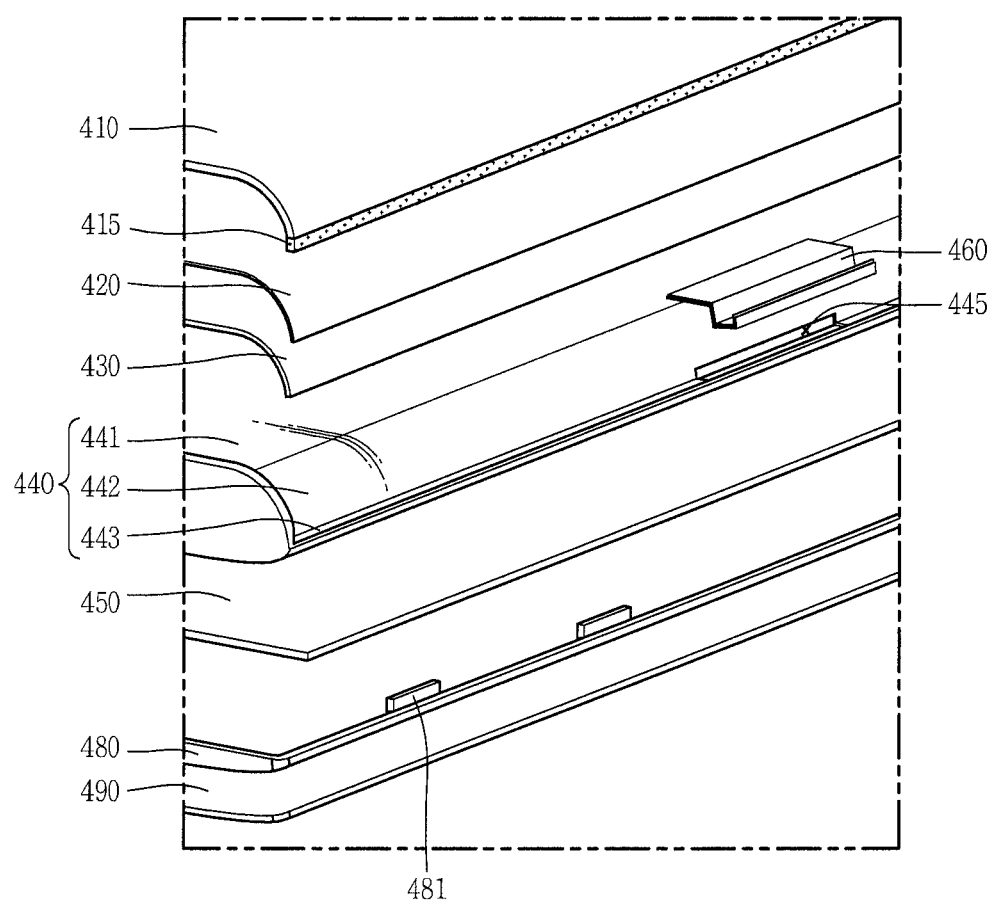
FIG. 9 is a partially-exploded perspective view of FIG. 8.

FIG. 8 is an exploded perspective view of a mobile terminal 400 in accordance with a second exemplary embodiment disclosed herein, FIG. 9 is a partially-exploded perspective view of FIG. 8, and FIG. 10 is a sectional view taken along the lines AA, BB and CC of FIG. 8. Hereinafter, the second exemplary embodiment disclosed herein will be described with reference to FIGS. 8 to 10. Repetitive description of the same/like configurations to the first exemplary embodiment will be omitted.

As illustrated in FIGS. 8 to 10, a window 410, a touch sensor 420 and a display 430, similar to the first embodiment, are curved at side surfaces of the terminal. This is also similar to a frame 440. That is, the display 430, the touch sensor 420 and the window 410 disposed on the frame 440 are curved toward the side surfaces in a corresponding shape, similar to the first embodiment. Also, the window 410, the touch sensor 420 and the display 430 may be integrally formed into a single display module 401.

Figure 10A:
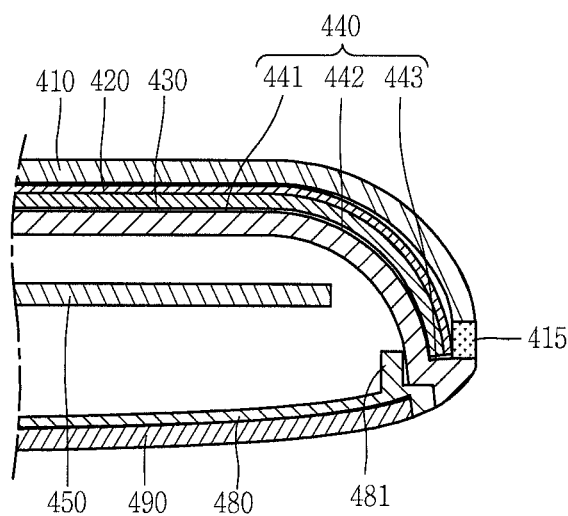
FIGS. 10A through 10C are sectional views taken along the lines AA, BB and CC of FIG. 8.
Figure 10B:
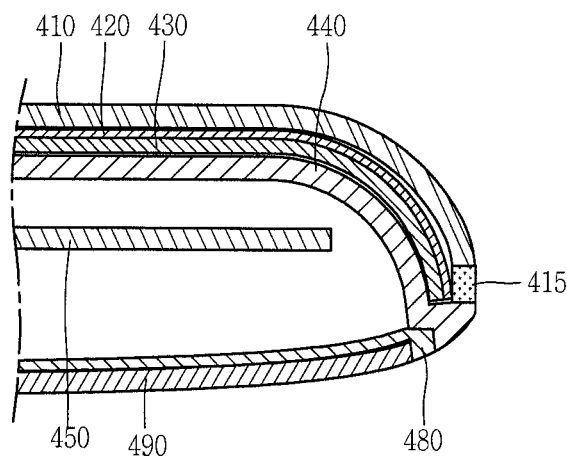

Here, the first exemplary embodiment has illustrated that the supporting members 370 support the touch sensor 320, the display 330 and the frame 340 as well as the window 310. However, the second exemplary embodiment employs mold members 415, instead of the supporting members 370. The mold members 415 may be formed on lower ends of the window 410 in a lengthwise direction of the mobile terminal 400 through an insert-injection molding operation. As illustrated in FIGS. 10A and 10B, the mold member 415 is as high as a portion at which the window 410 is formed shorter than the display 430.

In the second exemplary embodiment, the mold member 415 may correspond to the vertical portion 371 of the supporting member 370 of the first exemplary embodiment. However, in the second exemplary embodiment, a portion corresponding to the horizontal portion 372 of the supporting member 370 is formed by the frame 440. More specifically, as illustrated in FIG. 9, the frame 440 includes a front surface portion 441 that faces a front surface of the main body and is formed in a flat or curved shape, and a side surface portion 442 that extends from the front portion 441 and forms a curved surface curved toward the side surface of the mobile terminal 400.

In addition, in the second exemplary embodiment, the frame 440 further includes an edge portion 443 that protrudes from a lower end of the side surface portion 442 in a horizontal direction. The edge portion 443 is formed in a flat shape such that the mold member 415, the touch sensor 420 and the display 430 are flush with one another. However, the present invention may not be limited to this. As illustrated in a third exemplary embodiment to be explained later, a portion coming in contact with the mold member 415 may more protrude such that the touch sensor 420 and the display 430 can be fixedly inserted more stably.

As illustrated in FIGS. 10A and 10B, the mold member 415, the touch sensor 420 and the display 430 are mounted on the edge portion 443. A third protrusion 481 protrudes from an edge of an upper surface of the rear case 480 and comes in contact with an inner side surface of the frame 440. That is, the third protrusion 481 closely comes in contact with an inner side of the side surface portion 442 of the frame 440, and thus the frame 440 is firmly fixed to a rear case 480.

In the second exemplary embodiment, the mold member 415 may be modularized with the window 410 at the side end of the window 410 through the insert-injection molding operation. In addition, the window 410, the mold member 415, the touch sensor 420 and the display 430 may be integrated into a single module. Here, a printed circuit board 450, as similar to the first exemplary embodiment, is located between the frame 440 and the rear case 480.

Here, the frame 440 may extend down to a lower end portion of the side surface of the main body, and the rear surface of the frame 440 may be covered with the rear case 480 and the battery cover 490.

Figure 11:
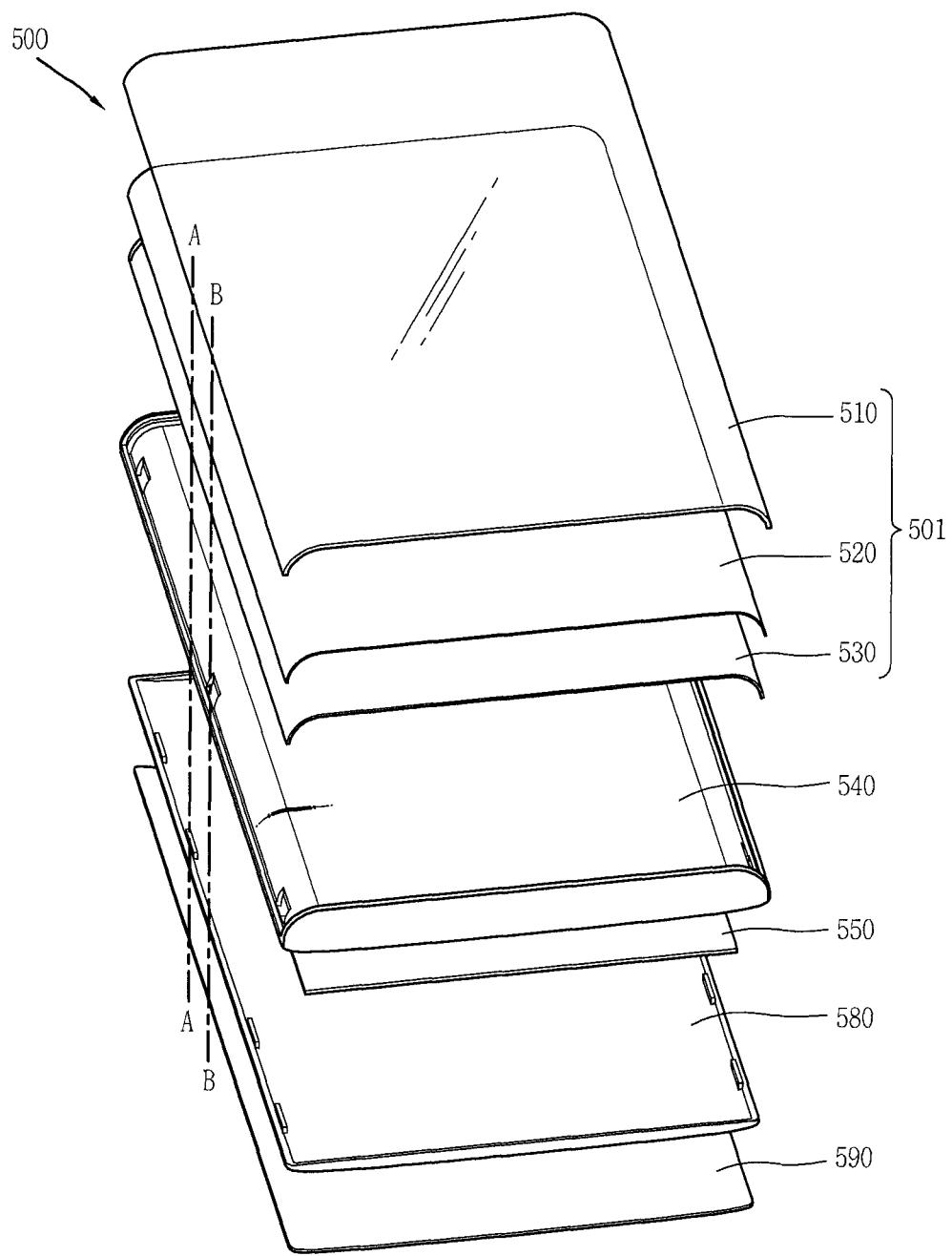
FIG. 11 is an exploded perspective view of a mobile terminal in accordance with a third exemplary embodiment disclosed herein.

FIG. 11 is an exploded perspective view of a mobile terminal 500 in accordance with a third exemplary embodiment disclosed herein, FIG. 9 is a partially-exploded perspective view of FIG. 11, and FIG. 13 is a sectional view taken along the lines AA and BB of FIG. 11. Hereinafter, the third exemplary embodiment disclosed herein will be explained with reference to FIGS. 11 to 13. Detailed description of the same/like configurations to the foregoing first and second exemplary embodiments will be omitted in the third exemplary embodiment.

Figure 13A:
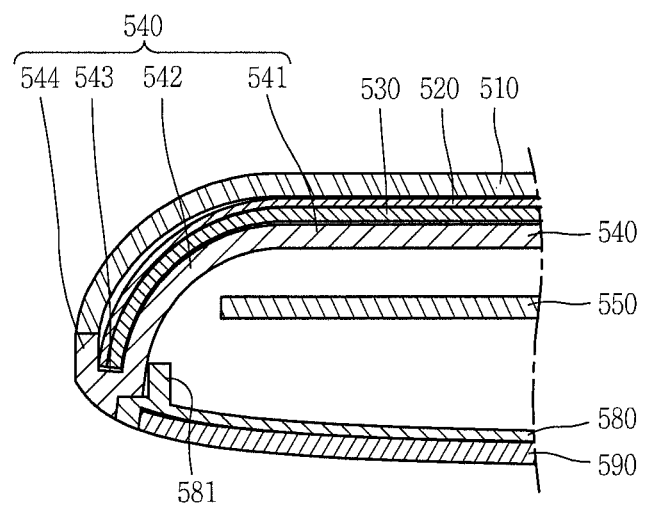
FIGS. 13A and 13B are sectional views taken along the lines AA and BB of FIG. 11.
Figure 13B:
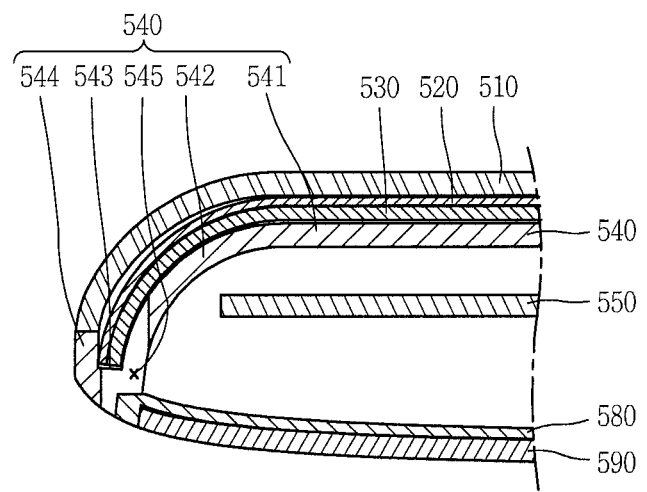

The third exemplary embodiment is similar to the second exemplary embodiment in that a window 510, a touch sensor 520 and a display 530 are mounted on a frame 540, but different from the second exemplary embodiment in view of replacing the mold member 415 with a protruding portion 544 protruding from the frame 540. That is, a supporting member in the third exemplary embodiment, as illustrated in FIGS. 13A and 13B, are the very frame 540. More specifically, the frame 540 includes a front surface portion 541 that faces a front surface and has a flat or curved surface, and a side surface portion 542 that extends from the front portion 541 and faces a side surface. The frame 540 further includes a recess portion 543 that extends from the side surface portion 542 and is recessed toward a bottom, and a protruding portion 544 that extends from the recess portion 543 and protrudes toward a top. That is, the recess portion 543 and the protruding portion 544 perform the function of the supporting member 370 in the first exemplary embodiment. Here, the protruding portion 544 is externally exposed so as to define a part of the appearance of the mobile terminal 500.

Also, fourth protrusions 581 are formed at an edge of an upper surface of the rear case 580. Each of the fourth protrusions 581 is closely adhered onto an inner side of the side portion 542 of the frame 540 so as to more enhance firm fixing between the frame 540 and the rear case 580. The fourth protrusion 581 is formed approximately as high as the recess portion 543.

Figure 12:
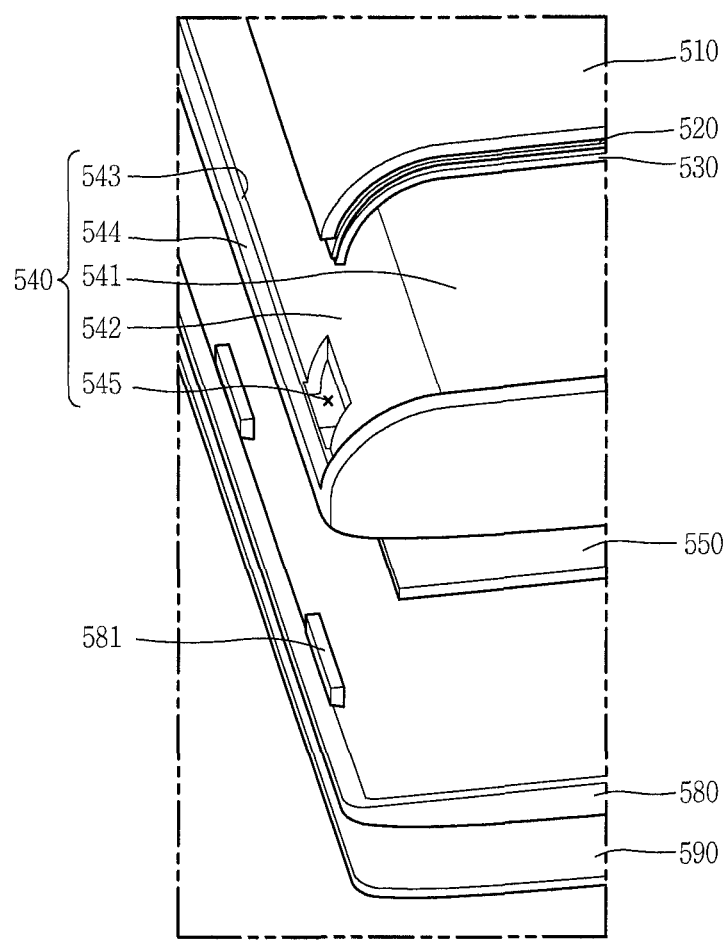
FIG. 12 is a partially-exploded perspective view of FIG. 11.

Here, a plurality of jig holes 545 are formed on the side portion 542, as illustrated in FIG. 12. The jig holes 545 are holes in which jigs (not illustrated) are partially inserted. The jigs facilitate the window 510, the touch sensor 520 and the display 530 to be mounted in the recess portion 543. For example, a bar may be inserted through the jig hole 545 from an inside of the jig hole 545 so as to be externally exposed. The window 510, the touch sensor 520 and the display 530 are then placed on the externally-exposed bar so as to be guided up to the recess portion 543.

The jig hole 545 is merely illustrated in the third exemplary embodiment, but the present invention is not limited to this. The first and second exemplary embodiments may similarly employ the jig hole 545 to facilitate the mounting of the window 510, the touch sensor 520 and the display 530.

In such a manner, the third exemplary embodiment has illustrated that the frame 540 which has already been used is changed in shape to define a space for mounting the window 510, the touch sensor 520 and the display 530 thereon and the protruding portion 544 comes in contact with the lower end of the window 510. A printed circuit board 550 is disposed between the frame 540 and the rear case 580. Here, the third exemplary embodiment is configured such that the frame 540 extends from the inside to outside of the main body to accommodate thereon the window 510, the touch sensor 520 and the display 530, without an additional member, thereby simplifying a fabrication process.

Figure 14:
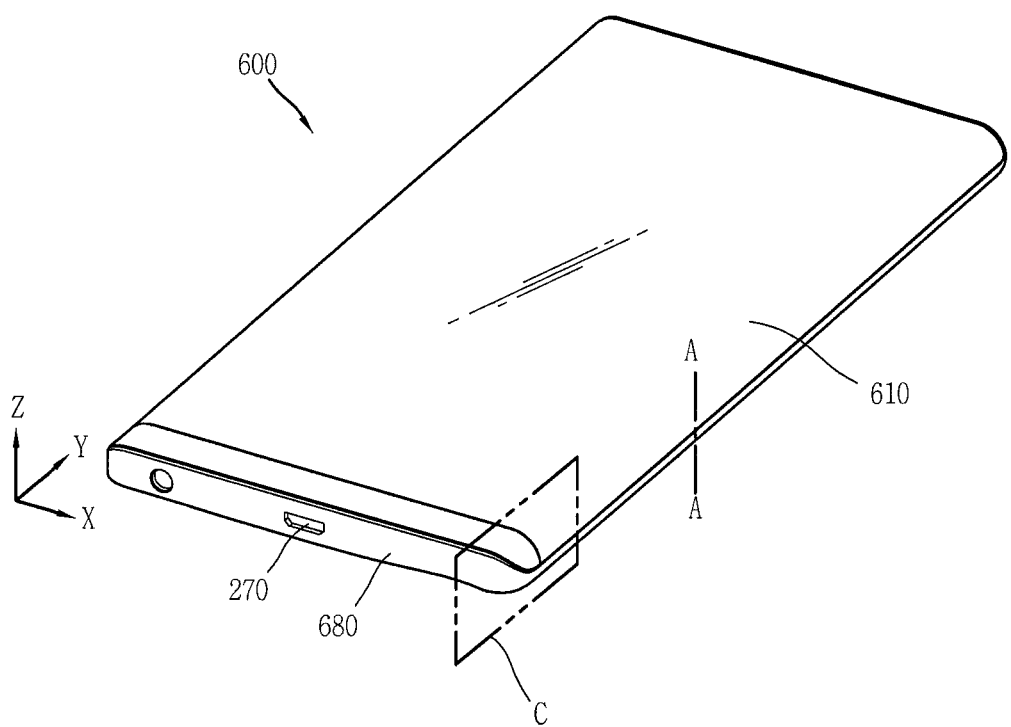
FIG. 14 is a perspective view of a mobile terminal in accordance with a fourth exemplary embodiment disclosed herein.
Figure 15:
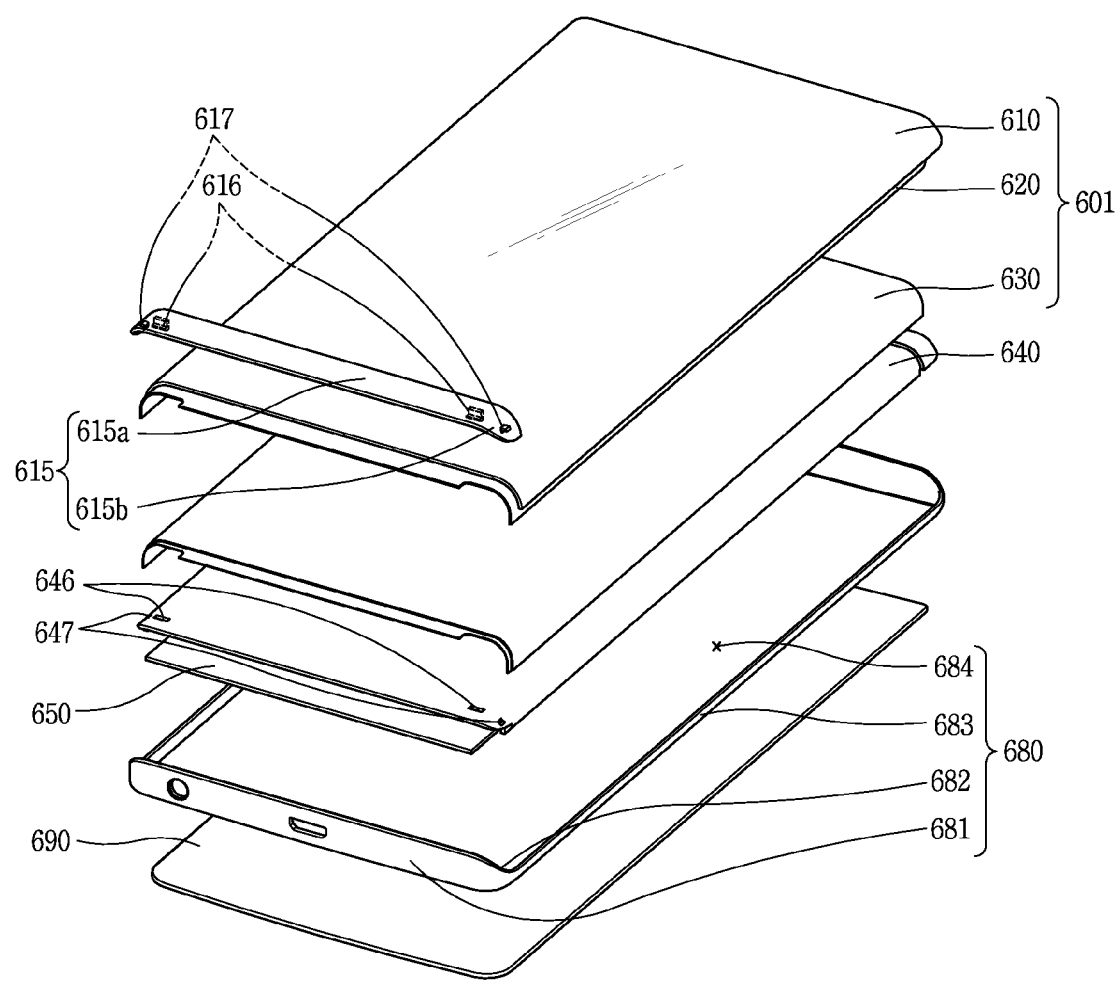
FIG. 15 is an exploded perspective view of FIG. 14.
Figure 16:
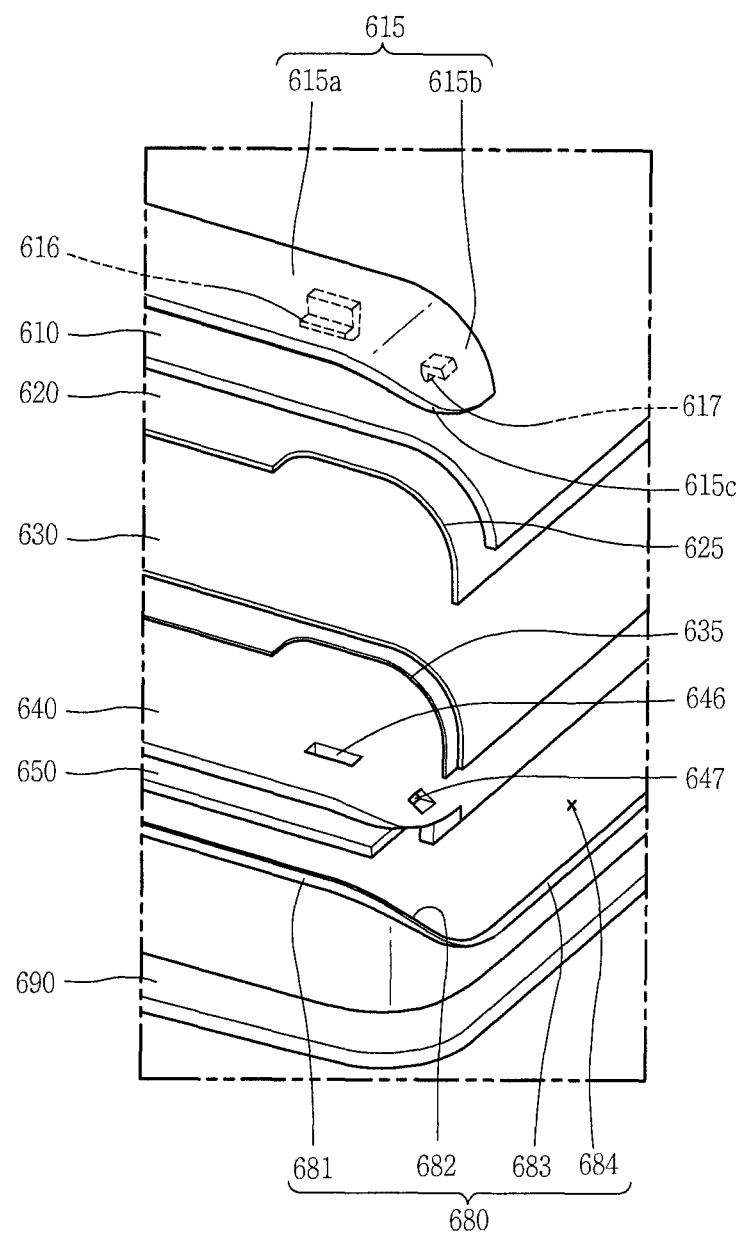
FIG. 16 is a partially-exploded perspective view of FIG. 15.
Figure 17:
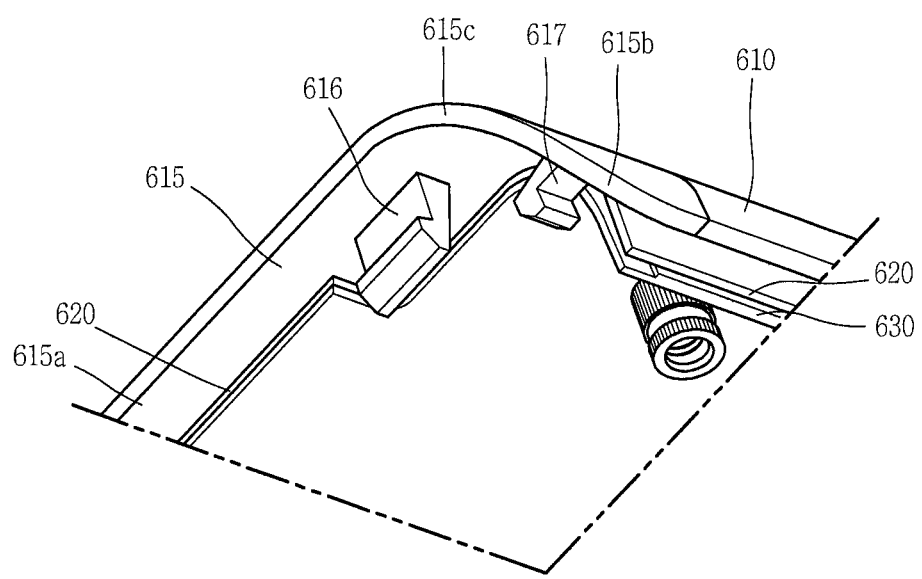
FIG. 17 is a bottom perspective view of a decoration member and a window of a mobile terminal in accordance with one exemplary embodiment disclosed herein.
Figure 18A:
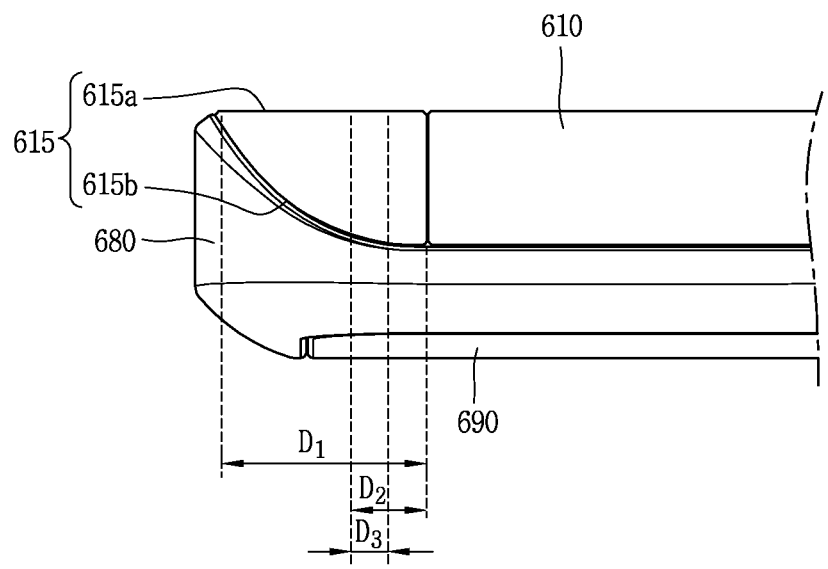
FIGS. 18A and 18B are lateral views of part C of FIG. 14.
Figure 18B:
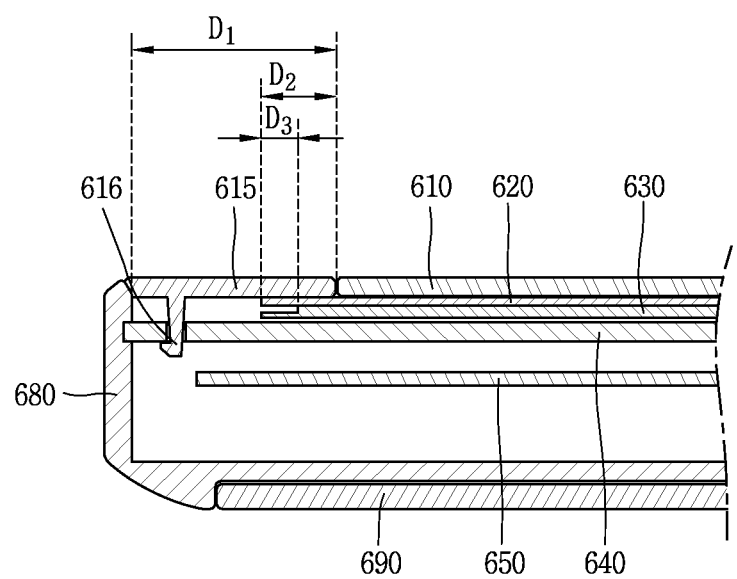
Figure 19A:
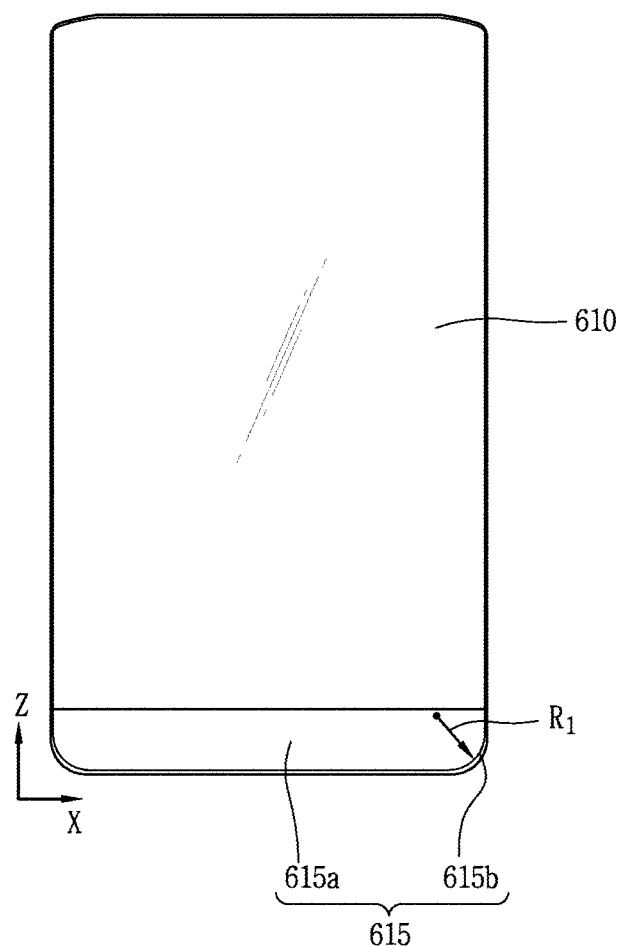
FIG. 19A through 19C are views illustrating curvatures of a decoration member in accordance with one exemplary embodiment disclosed herein.
Figure 19B:
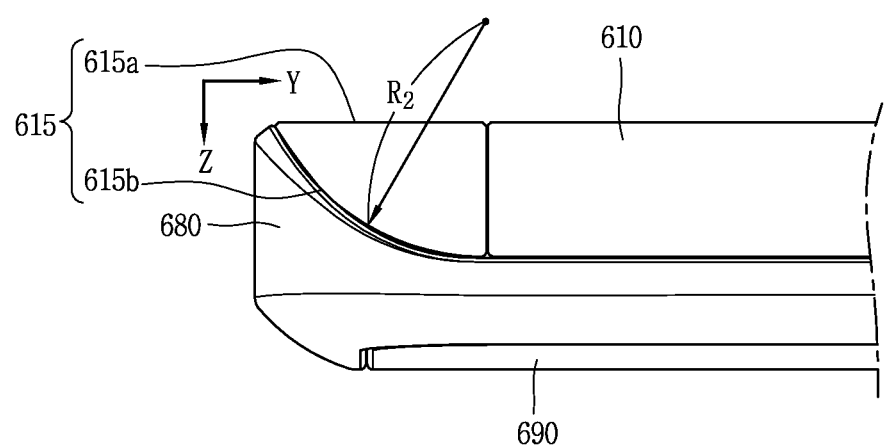
Figure 19C:
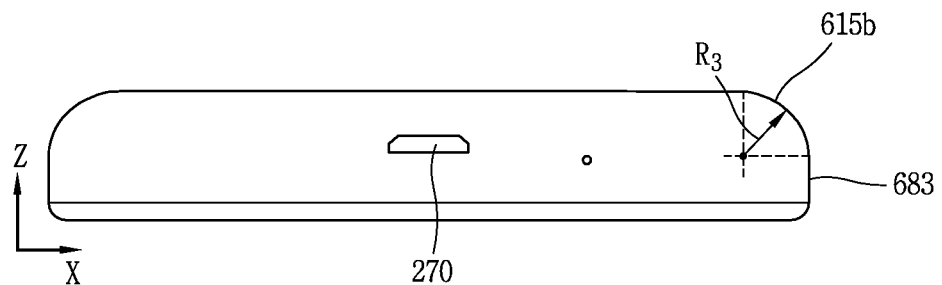
Figure 20:
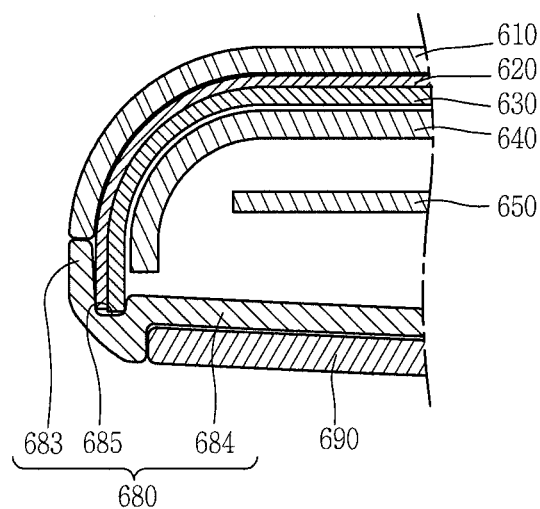
FIG. 20 is a sectional view taken along the line AA of FIG. 14.

FIG. 14 is a perspective view of a mobile terminal 600 in accordance with a fourth exemplary embodiment disclosed herein, FIG. 15 is an exploded perspective view of FIG. 14, FIG. 16 is a partially-exploded perspective view of FIG. 15, FIG. 17 is a bottom perspective view of a decoration member and a window of a mobile terminal in accordance with one exemplary embodiment disclosed herein, FIGS. 18A and 18B are lateral views of part C of FIG. 14, FIG. 19A through 19C are views illustrating curvatures of a decoration member in accordance with one exemplary embodiment disclosed herein, FIG. 20 is a sectional view taken along the line AA of FIG. 14.

Hereinafter, the fourth exemplary embodiment disclosed herein will be described with reference to FIGS. 14 to 20.

Detailed description of the same/like configurations to the foregoing first to third exemplary embodiments will be omitted in the fourth exemplary embodiment.

A supporting member in the fourth exemplary embodiment is formed by extending a rear case 680. The third exemplary embodiment uses an existing frame 640, but the fourth exemplary embodiment uses the rear case 680.

FIG. 4 is a partial sectional view of a mobile terminal in accordance with one exemplary embodiment disclosed herein. As illustrated in FIG. 4, a mobile terminal in accordance with one exemplary embodiment disclosed herein may be configured to be thinner because a front case 101 and a rear case 380 are integrally formed with each other. That is, the aforementioned mobile terminal 100 is configured such that the display unit 151 is provided on the front case 101 and various electronic components are located in a space between the front case 101 and the rear case 102. However, in the one exemplary embodiment of the present invention, a window 310, a touch sensor 320 and a display 330 are provided on the rear case 380 and various electronic components are located between the rear case 380 and a battery cover 390.

Here, the frame 340, as illustrated in FIG. 4, includes a front surface portion 341 facing the front surface of the terminal (or the main body) and having a flat or curved surface, and side surface portions 341 each extending from the front surface portion 341 and curved toward the side surface of the terminal. The side surface portion 342 is formed to be almost perpendicular to the front surface portion 341, and a curved section of the side surface portion 342, unlike the window 310, can exceed 90°. For example, the front surface portion 341 may be formed in a curved shape, for example, formed to be convex toward the front surface of the terminal. FIG. 4 merely illustrates an example that the front surface portion 341 is formed in a flat shape.

FIG. 14 is a perspective view of a mobile terminal 600 in accordance with one exemplary embodiment disclosed herein, FIG. 15 is an exploded perspective view of FIG. 14, and FIG. 16 is partially-exploded perspective view of FIG. 15.

Hereinafter, one exemplary embodiment disclosed herein will be described with reference to FIGS. 14 to 16, and it is assumed that a widthwise direction of the mobile terminal 600 is an X-axial direction, a lengthwise direction is an Y-axial direction, and a thickness direction is a Z-axial direction.

A mobile terminal 600 in accordance with one exemplary embodiment disclosed herein may include a main body having front and side surfaces, a window 610 curved (or bent) from the front surface to one point of each side surface so as to define at least a part of each side surface, a touch sensor 620 disposed on a rear surface of the window 610 and curved along the shape of the window 610, a display 630 disposed on a rear surface of the touch sensor 620 and curved along the shape of the touch sensor 620, a frame 640 disposed on a rear surface of the display 630 and having a shape corresponding to the display 630 to support the display 630, and a rear case 680 covering a rear surface of the main body.

The rear case 680 includes supporting members 370 to support ends of the window 610, the touch sensor 620, and the display 630.

Here, since the touch sensor 620 and the display 630 are formed longer than the window 610 toward the side surfaces of the main body, the supporting members 370 are components for supporting the window 610 while coming in contact with the window 610.

The touch sensor 620 and the display 630, as illustrated in FIGS. 16 to 20, are longer or wider than the window 610 by an externally-exposed region thereof. That is, as illustrated in relation to the supporting member 370 of FIG. 4, the touch sensor 620 and the display 630 are formed longer than the window 610 by the portion D.

The supporting member 370 in the fourth exemplary embodiment disclosed herein is formed by extending from the rear case 680, namely, by using the already-used rear case 680.

FIG. 15 is an exploded perspective view of FIG. 14, and FIG. 20 is a sectional view taken along the line AA of FIG. 14. As illustrated in FIGS. 15 and 20, the rear case 680 includes an accommodating portion 685 that accommodates therein the touch sensor 620 and the display 630, and a sidewall portion 683 that upwardly extends from an end of the accommodating portion 685 to come in contact with the window 610. The accommodating portion 685 is more recessed than the other portion of the rear case 680 such that the touch sensor 620 and the display 630 can be easily accommodated therein. That is, the supporting member 370 corresponds to the same portion as the sidewall portion 683.

Meanwhile, referring to FIG. 15, the rear case 680 includes the sidewall portion 683 that is formed long in an Y-axial direction, a bottom surface portion 681 that extends from the sidewall portion 683 in an X-axial direction to be perpendicular to the sidewall portion 683 and is formed higher than the sidewall portion 683 in a Z-axial direction, and a curved surface portion 682 that is curved to connect the bottom surface portion 681 and the sidewall portion 683 to each other.

A decoration member 615 is further provided at one side of the window 610. The decoration member 615 has the same thickness as the window 610 and is mounted on the bottom surface portion 681 and the curved surface portion 682. The curved surface portion 682 should have a shape corresponding to an end portion of the decoration member 615.

The decoration member 615 includes a main surface portion 615a that is formed on a front surface thereof and occupies most of the front surface, and a curved portion 615b that extends from the main surface portion 615a and is curved to be mounted on the curved surface portion 682. That is, the decoration member 615 is a component for smoothly connecting the curved surface portion 682 and the window 610 to each other. The curved surface portion 682 and the curved portion 615b have the corresponding shapes so as to be engaged with each other.

Also, in the one exemplary embodiment, as illustrated in FIGS. 15 to 17, hooks 616 and 617 are utilized to fix the touch sensor 620 and the display 630.

For example, a first hook 616 is formed on the main surface portion 615a of the decoration member 615, and a first hole 646 is formed on the front surface portion 341 (see FIG. 4) of the frame 640. The first hook 616 is then fixedly inserted into the first hole 646, to tightly secure the touch sensor 620 and the display 630 between the decoration member 615 and the frame 640.

A second hook 617 is formed on the curved portion 615b of the decoration member 615, and a second hole 647 is formed on the side surface portion 342 (see FIG. 4) of the frame 640. The second hook 617 is fixedly inserted into the second hole 647, to prevent the curved portion 615b from being detached. That is, the first hook 616 is used for the purpose of preventing a movement of the decoration member 615 in the Z-axial direction, and the second hook 617 is used for the purpose of preventing the detachment of the decoration member 615 in the X-axial direction.

Also, those drawings illustrate that the decoration member 615 is located at a lower end of the mobile terminal 600, but may also be provided at an upper end of the mobile terminal, if necessary. Here, the decoration member 615 may be made of polycarbonate (PC), and generally used for shielding a lower bezel of the mobile terminal 600. A bezel in one exemplary embodiment refers to a region on which an image signal is not output of an entire region of the mobile terminal 600. The bezel is generally formed by a circuit (including a printed circuit board and a flexible printed circuit board) for driving the mobile terminal 600 or a case.

Meanwhile, FIG. 19A is a view of the mobile terminal 600, viewed in the Z-axial direction. The curved portion 615*b* of the decoration member 615 is formed with a curvature R1 on an XY plane. In one exemplary embodiment, the decoration member 615 is disposed on the lower bezel and has corner portions curved. That is, in the front view of the mobile terminal 600, as illustrated in FIG. 19A, four corners have a uniform radius R1. The one embodiment disclosed herein proposes a form that the decoration member 615 and the rear case 680 are coupled to each other.

Also, FIG. 19B is a view of the mobile terminal 600, viewed in the X-axial direction, and FIG. 19C is a view of the mobile terminal 600, viewed in the Y-axial direction. The decoration member 615 has a curvature R2 on an YZ plane, and a curvature R3 on a ZX plane. As such, the decoration member 615 is three-dimensionally formed with the predetermined curvatures.

The decoration member 615 with the curvatures, as illustrated in FIG. 16, is disposed on the touch sensor 620, and the printed circuit board 650 is disposed between the frame 640 and the rear case 680. Also, the rear case 680 also includes a wide and flat cover portion 684 that is formed at one side of the accommodating portion 685 to cover the rear surface of the main body.

FIGS. 18A and 18B are a lateral view and a sectional view of a part C of FIG. 14, respectively. As illustrated in FIGS. 18A and 18B, the touch sensor 620 and the display 630 are formed longer than the window 610 in a lengthwise direction (i.e., the Y-axial direction in FIG. 14) of the main body of the terminal.

As aforementioned, the decoration member 615 is curved with the predetermined curvatures R1, R2 and R3 on the XY, YZ and ZX planes. In order to mount the decoration member 615 with the three-dimensional curvatures on the rear case 680, cutout portions 625 and 635 (see FIG. 16) are formed at end portions of the touch sensor 620 and the display 630, respectively, in one exemplary embodiment disclosed herein. Each end portion with the cutout portion 625 and 635 of the touch sensor 620 and the display 630 corresponds to the curved portion 615*b* and a section from the curved portion 615*b* to one point of the main surface portion 615*a*. The cutout portions may also fully meet the purpose of the present invention as long as they are formed at side end portions of the touch sensor 620 and the display 630.

Since the curved portion 615*b* of the decoration member 615 has the three-dimensional curvatures along the X-axial, Y-axial and Z-axial directions, when the touch sensor 620 and the display 630 extend up to a region D2 illustrated in FIGS. 18A and 18B without the cutout portions 625 and 635, a starting point that the decoration member 615 is curved should be moved to the left side of a boundary between the window 610 and the decoration member 615 in FIGS. 18A and 18B, and accordingly the decoration member 615 should have a more increased width D1.

For example, as illustrated in FIG. 19A, the curved portion 615*b* should be inwardly curved with a predetermined curvature, starting from the boundary between the window 610 and the decoration member 615 within the XY plane. However, the curved portion 615*b* cannot be inwardly curved if the cutout portions 625 and 635 are not formed.

That is, the cutout portions 625 and 635 may result in ensuring a space in which the curved portion 615*b* can be curved.

If the decoration member 615 increases in width, the lower bezel of the mobile terminal 600 increases in size. To prevent this in the one exemplary embodiment, as illustrated in FIG. 16, the cutout portions 625 and 635 are formed at the touch sensor 620 and the display 630. The formation of the cutout portions 625 and 635 may allow the curved portion 615*b* of the decoration member 615 to have the curvatures in the three-dimensional manner, without moving the starting point that the decoration member 615 is curved to the left side of the boundary between the window 610 and the decoration member 615 in FIGS. 18A and 18B. That is, the curved portion 615*b* of the decoration member 615 can be curved in the X-axial, Y-axial and Z-axial directions at the boundary between the window 610 and the decoration member 615. This may result in preventing an increase in the size of the lower bezel of the mobile terminal and simultaneously providing an attractive design.

The corner structure for reducing the lower bezel has been described, which will equally be applied to an upper bezel. That is, the decoration member 615 which is disposed on an upper end of the mobile terminal and mounted on the bottom surface portion 681 and the curved surface portion 682 may be formed. Here, the upper bezel, similar to the lower bezel, can be reduced in size.

Also, when the window 610 located on the top of the mobile terminal is configured to be curved with three-dimensional curvatures, similar to the curved portion 615*b* of the decoration member 615, and the cutout portions 625 and 635 are formed at the touch sensor 620 and the display 630, the upper bezel of the mobile terminal, similar to the aforementioned lower bezel, can be reduced in size.

In such a manner, according to one embodiment disclosed herein, the lower or upper bezel can be minimized in size. Here, since the decoration member 615 is a portion where image information cannot be output, the first manipulation unit 123*a* should be located within the region of the display 630.

Meanwhile, the cutout portions 625 and 635 may also be formed at at least a part of the region D2, or at least a part of a region D3.

Here, D1 refers to the width of the decoration member 615, and also corresponds to the size of the lower bezel of the mobile terminal 600. D2 refers to a region where the touch sensor 620 and the display 630 are formed longer than the window 610, and D3 refers to a stepped portion of the display 630, as illustrated in FIGS. 18A and 18B.

Here, when the cutout portions 625 and 635 are formed near the boundary between the decoration member 615 and the window 610, it is difficult to achieve the purpose for fixing the touch sensor 620 and the display 630 by the first hook 616. Therefore, the cutout portions 625 and 635 are preferably formed at a part of the region D3.

That is, the decoration member 615 should be located on the upper surface of the touch sensor 620.

As illustrated in FIG. 20, the rear case 680 includes a sidewall portion 683 that is brought into contact with a window 610, and an accommodating portion 685 that is formed at an inner side of the sidewall portion 683 and accommodates a touch sensor 620 and a display 630 therein. The accommodating portion 685 is more recessed than the other portion of the rear case 680 such that the touch sensor 620 and the display 630 can be easily accommodated therein. Meanwhile, referring to FIG. 16, the rear case 680 includes a bottom surface portion 681 that perpendicularly extends from the sidewall portion 683 and is higher than the sidewall portion 683, and a curved surface portion 682 that is curved to connect the bottom surface portion 681 and the sidewall portion 683 to each other.

Meanwhile, a decoration member 615 which has the same thickness as the window 610 is further provided at one side of the window 610, such that the bottom surface portion 681 and the curved surface portion 682 are mounted thereon. The decoration member 615 includes a main surface portion 615a that is formed on a front surface thereof and occupies most of the front surface, and a curved portion 615b that extends from the main surface portion 615a and is curved to be mounted on the curved surface portion 682. That is, the decoration member 615 is a configuration for smoothly connecting the curved surface portion 682 and the window 610 to each other. The curved surface portion 682 and the curved portion 615b may have the corresponding shapes so as to be engaged with each other.

Here, the decoration member 615, as illustrated in FIG. 16, is located on an upper portion of the touch sensor 620, and a printed circuit board 650 is disposed between the frame 640 and the rear case 680. Also, a cover portion 684 for covering a rear surface of the terminal main body is widely formed at one side of the accommodating portion 685.

Meanwhile, one embodiment of the present invention may have a problem in view of a connection of a flexible printed circuit board (FPCB) in case where side surfaces of a mobile terminal are curved.

Figure 21:
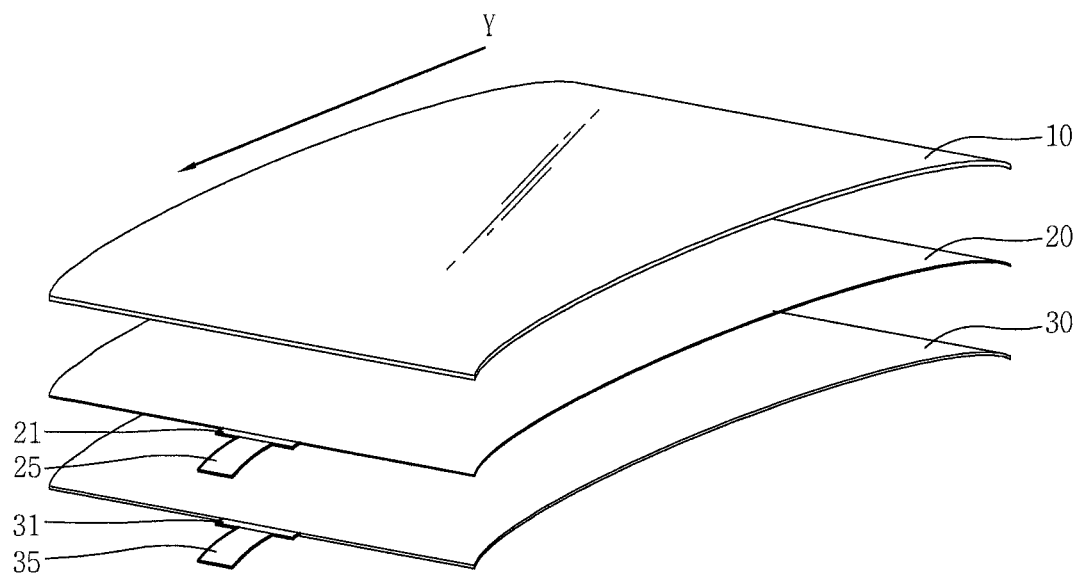
FIG. 21 is a partially-exploded perspective view in case where a mobile terminal is curved along a lengthwise direction thereof.

FIG. 21 is a partial perspective view in case where a mobile terminal is curved along a lengthwise direction thereof. As illustrated in FIG. 21, a window 10, a touch sensor 20 and a display 30 may all be curved in a lengthwise direction (Y-direction) of the mobile terminal. Here, drive integrated circuit (IC) chips 21 and 31 of the touch sensor 20 and the display 30 are attached to lower ends of the touch sensor 20 and the display 30, respectively, and connected to a printed circuit board (not illustrated) by FPCBs 25 and 35, respectively.

Figure 22:
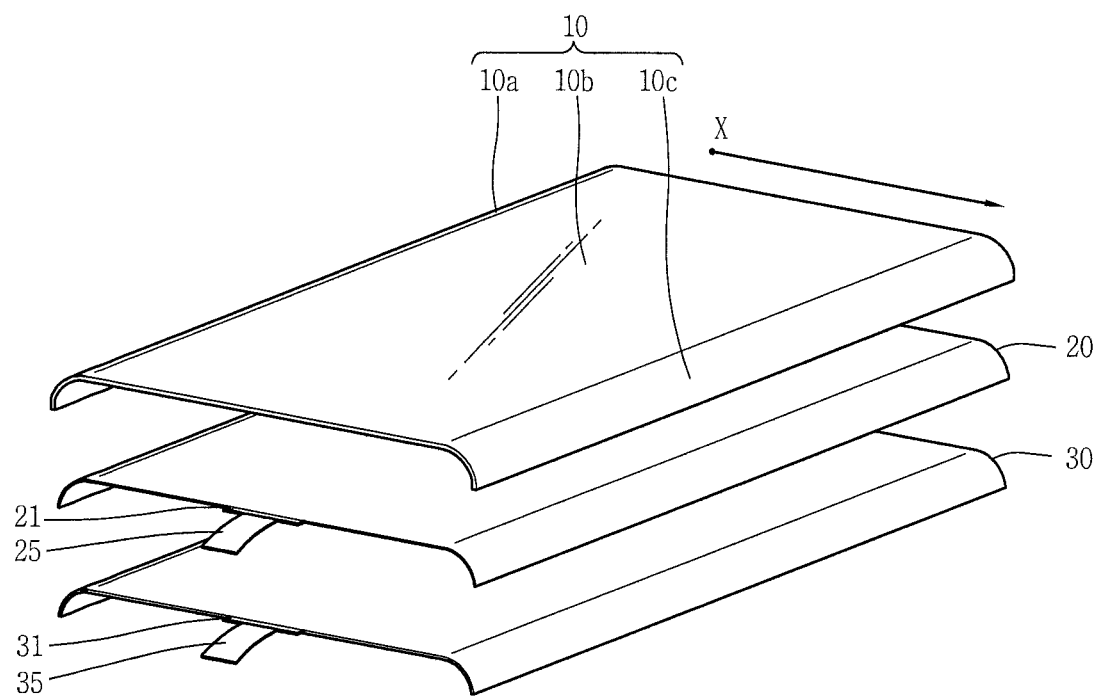
FIG. 22 is a partially-exploded perspective view in case where a mobile terminal is curved at both ends in a widthwise direction thereof.

In such a manner, when the mobile terminal is curved in the lengthwise direction, there is not a big problem in an arrangement space of the drive IC chips 21 and 31. However, as illustrated in FIG. 22, when the mobile terminal is curved in a widthwise direction (X-direction) of the mobile terminal, there is a problem that portions to which the driver IC chips 21 and 31 are attached cannot be curved. That is, if the window 10 is divided into a central region 10b and both side surfaces 10a and 10c, the window 10 may merely be curved at the both side surfaces 10a and 10c, failing to be curved at the central region 10b.

Figure 23:
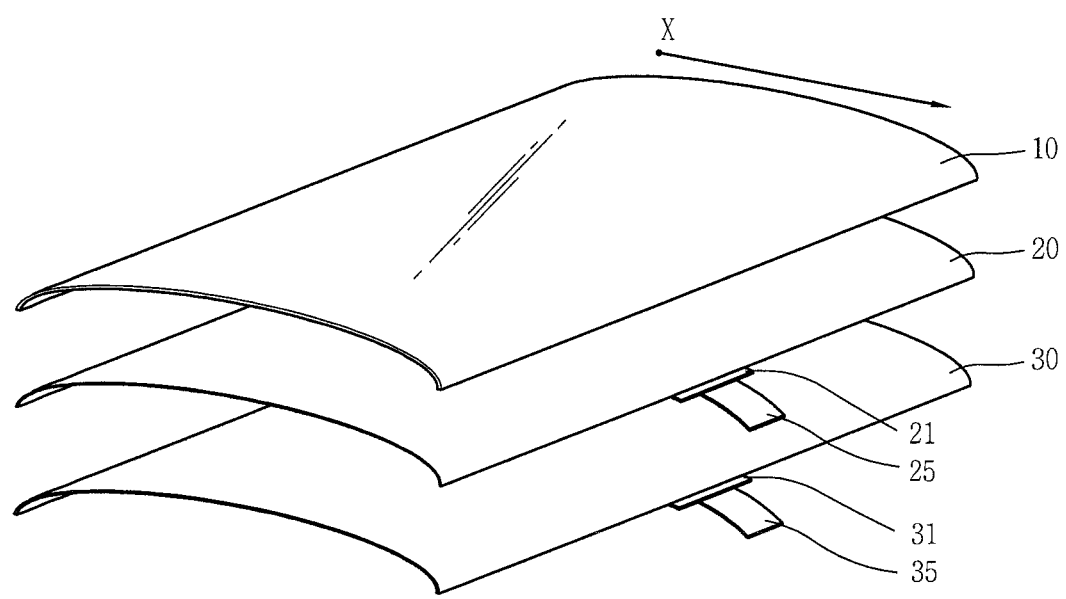
FIG. 23 is a partially-exploded perspective view in case where a mobile terminal is curved entirely along a widthwise direction thereof.

However, as illustrated in FIG. 23, if the driver IC chips 21 and 31 and the FPCBs 25 and 35 are arranged on the side surface of the mobile terminal, the mobile terminal can be fully curved in the widthwise direction thereof.

The present invention, as illustrated in FIG. 23, relates to a mobile terminal which is capable of being curved partially or entirely in a widthwise direction thereof by arranging FPCBs on a side surface of the mobile terminal.

Hereinafter, a configuration therefor will be explained.

As aforementioned, FIG. 5 is the exploded perspective view of the mobile terminal 300 in accordance with the first exemplary embodiment disclosed herein, FIG. 6 is the partially-exploded perspective view of FIG. 5, and FIG. 7 is the sectional view taken along the lines AA, BB and CC of FIG. 5. Hereinafter, a fifth exemplary embodiment will be described with reference to FIGS. 5 to 7. That is, the fifth exemplary embodiment is related to the first exemplary embodiment.

First, a mobile terminal 300 according to the fifth exemplary embodiment includes a main body having front and side surfaces, a display module 301 disposed on a top of the main body and curved from the front surface to the side surfaces to define at least parts of the side surfaces, a frame 340 disposed on a rear surface of the display module 301 and having a shape corresponding to the display module 301 to support the display module 301, a rear case 380 covering a rear surface of the main body, a PCB 350 located between the frame 340 and the rear case 380, and an FPCB 360 having one end connected to a side surface of the display module 301 and the other end electrically connected to the PCB 350.

Here, the FPCB 360 may be connected to the PCB 350 in a manner of bypassing the frame 340 (see the fifth exemplary embodiment) or penetrating through the frame 340 (see a sixth exemplary embodiment).

Here, the frame 340 includes a front surface portion 341 facing the front surface of the mobile terminal and having a flat or curved surface, and a side surface portion 342 extending from the front surface portion 341 toward the side surface of the mobile terminal so as to define at least a part of the side surface. The side surface portion 342 is formed to be almost perpendicular to the front surface portion 341, and can have a curved section exceeding 90°, unlike the window 310. The shapes of the front surface portion 341 and the side surface portion 342 are also applied equally to the display module 301, and also to the sixth exemplary embodiment to be explained later.

Here, the touch sensor 320 and the display 330 are curved to correspond to the curved shape of the window 310. When the front surface portion 341 of the frame 340 is curved, the display 330, the touch sensor 320 and the window 310 are curved accordingly. The PCB 350 is located beneath the frame 340 so as to perform a function of the controller 180.

The window 310, 410 in one embodiment disclosed herein is implemented as a single window. The touch sensor 320, 420 is located between the window 310, 410 and the display 330, 430 to sense a touch input applied to the window 310, 410.

One embodiment disclosed herein may allow for an integral structure of the display 330 disposed on the upper surface of the frame 340 and curved from the front surface toward the side surface, the touch sensor 320 disposed on the upper surface of the display 330 and curved along the shape of the display 330 to form at least the part of the side surface, and the window 310 disposed on the upper surface of the touch sensor 320 to form the appearance of the mobile terminal. That is, the display 330, the touch sensor 320 and the window 310 may be the components of the display module 301. This is equally applied to the sixth exemplary embodiment to be explained later.

As illustrated in FIG. 5, the supporting members 370 are disposed at both sides in the lengthwise direction of the mobile terminal 300 between the frame 340 and the rear case 380, to support lower portions of the display module 301 and the side surface portions 342 of the frame 340. Each of the supporting members 370 includes a vertical portion 371 that connects the window 310 and the rear case 380 so as to define at least a part of the appearance of the mobile terminal 300, and comes in contact with the window 310, and a horizontal portion 372 that accommodates thereon the touch sensor 320, the display 330 and the frame 340.

Here, since each supporting member 370 defines the part of the appearance of the mobile terminal 300, the supporting member 370 may have a smoothly curved surface from a portion contacting the window 310 to portion contacting the rear case 380. That is, that the vertical portion 371 and the horizontal portion 372 are perpendicular to each other merely indicates that portions thereof forming a space for mounting the touch sensor 320, the display 330 and the frame 340 are approximately perpendicular to each other, but does not indicate that the entire supporting member 370 is exactly formed in the perpendicular shape.

Figure 6A:
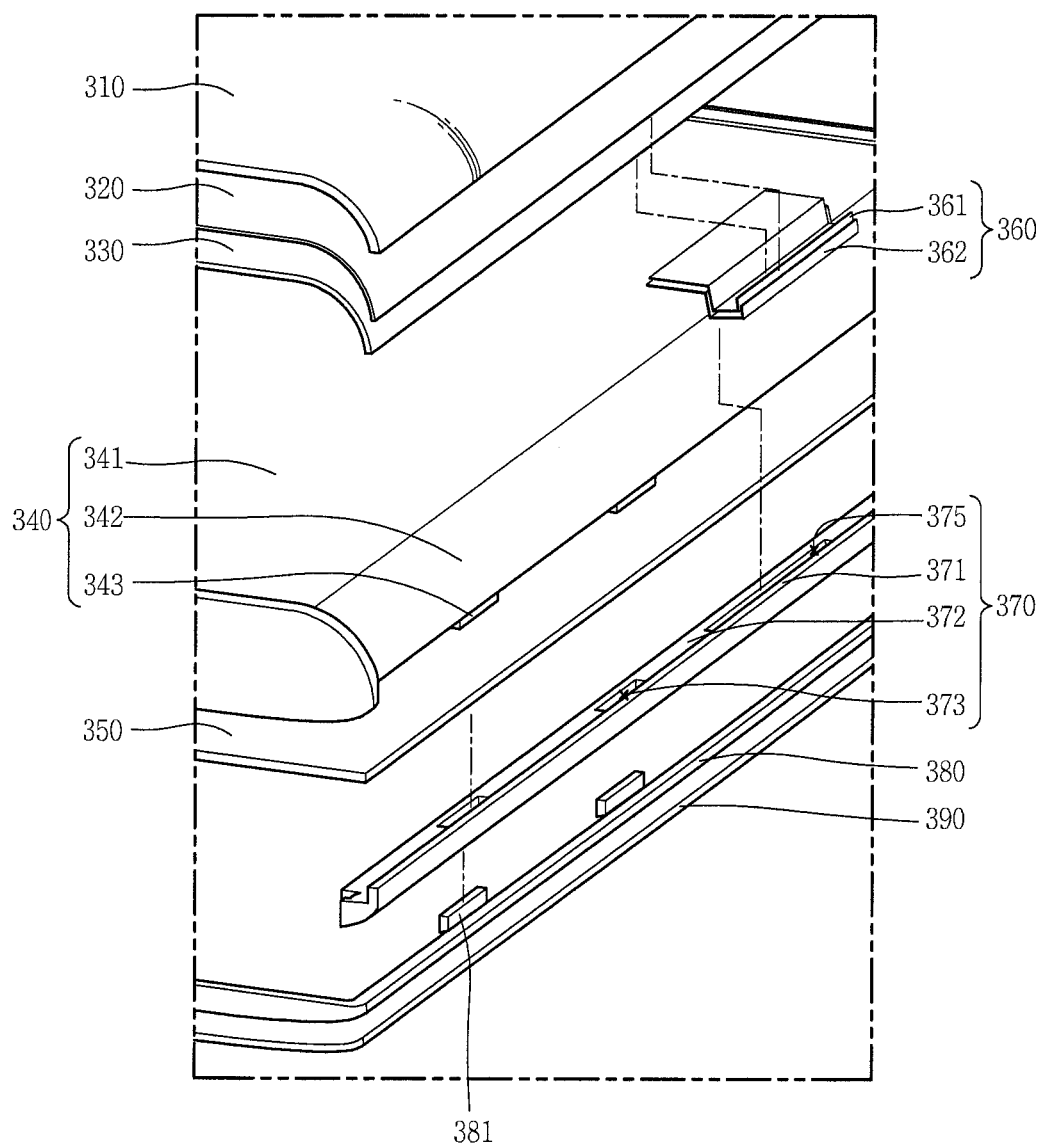
FIGS. 6A and 6B are partially-exploded perspective views of FIG. 5.
Figure 6B:
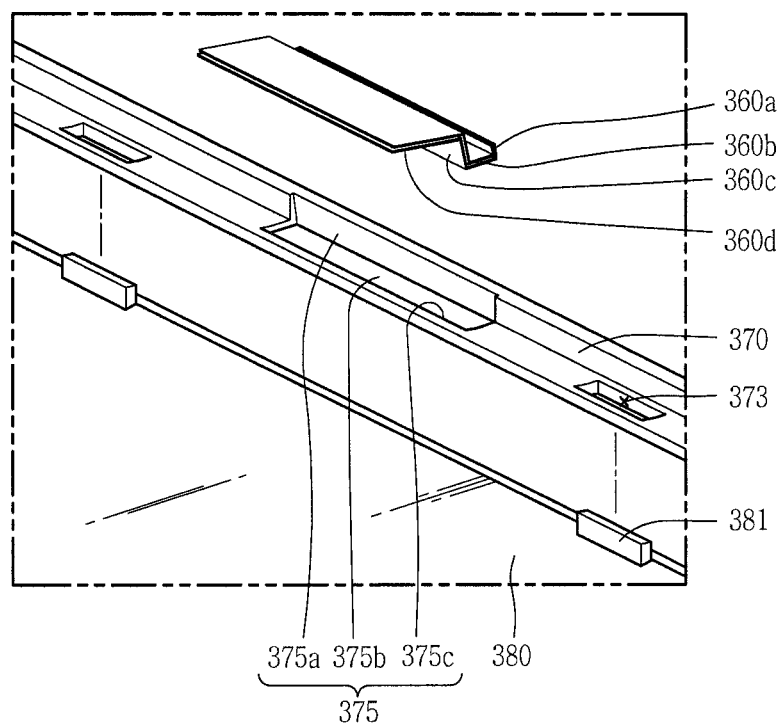

An accommodation groove 375 in which the FPCB 360 is mounted is formed along the vertical portion 371 and the horizontal portion 372. The accommodation groove 375, as illustrated in FIGS. 6A and 6B, includes a first part 375a recessed into the vertical portion 371, and a second part 375b formed perpendicular to the first part 375a and recessed into the horizontal portion 372. Here, a sidewall 375c which protrudes from the second part 375b and has a step corresponding to a height of the horizontal portion 372 is formed.

Meanwhile, the FPCB 360 includes a first vertical portion 360a that is accommodated in the first part 375a and connected to an end of the display module 301, a first horizontal portion 360b that perpendicularly extends from the first vertical portion 360a and is accommodated in the second part 375b, a second vertical portion 360c that extends from the first horizontal portion 360b and is upwardly formed along the sidewall 375c, and a second horizontal portion 360d that extends from the second vertical portion 360c over the accommodating groove 375 so as to be connected to the PCB 350. Here, the FPCB 360 includes a first FPCB 361 that is connected to the touch sensor 320 and the PCB 350 to realize a touch function, and a second FPCB 362 that is connected to the display 330 and the PCB 350 to represent image information. The first FPCB 361 and the second FPCB 362 have the same shape and overlap each other.

Lower end portions of the frame 340, the touch sensor 320 and the display 330 are placed on the first horizontal portion 360b. That is, when the display module 301 and the frame 340 are coupled to the supporting member 370, the FPCB 360 is pressed. Here, the FPCB 360 and the PCB 350 may be connected to each other by a connector 365 (see FIG. 7C).

Meanwhile, the horizontal portion 372 is provided with a first through hole 373, in which a first protrusion 343 formed on an edge of the lower end of the frame 340 and a second protrusion 381 protruding from an edge of an upper surface of the rear case 380 are inserted. Referring to FIG. 7B, it can be understood that the first through hole 373 is formed in a plural through the horizontal portion 372 of the supporting member 370, and both of the first protrusion 343 protruding from the lower end of the frame 340 and the second protrusion 381 protruding from the upper surface of the rear case 380 are simultaneously inserted into each first through hole 373.

In such a manner, the frame 340 and the rear case 380 are engaged with the supporting member 370 in the manner that both of the first protrusion 343 and the second protrusion 381 are simultaneously into the single through hole 373 in a closely-adhered state. FIG. 7B is a sectional view taken along the line BB of FIG. 5, which shows that the first protrusion 343 is formed more outside than the second protrusion 381. The first protrusion 343 is as high as the first through hole 373 formed through the horizontal portion 372.

Figure 7C:
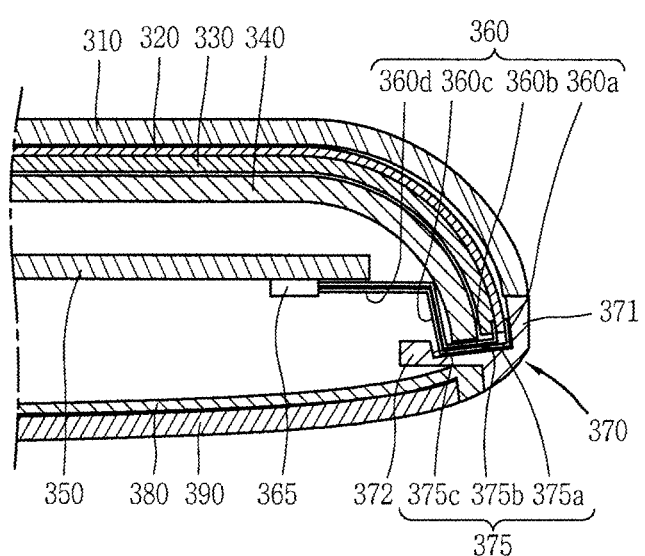

FIG. 7C is a sectional view taken along the line CC of FIG. 5. The FPCB 360 is connected to ends of the touch sensor 320 and the display 330 to be mounted in the accommodation groove 375 formed at the supporting member 370, and connected to the PCB 350 by the connector 365.

Here, the window 310 is formed along the side surface of the mobile terminal to be shorter than the touch sensor 320 and the display 330. In this instance, the part shorter than the touch sensor 320 and the display 330 is supplemented by the supporting member 370. This may allow the touch sensor 320 and the display 330 to be stably mounted on the supporting member 370 together with the window 310.

Hereinafter, a mobile terminal 400 according to a sixth exemplary embodiment disclosed herein will be described. In the following variation or embodiment, the same/like reference numerals are given to the same/like components to the foregoing embodiments, and description thereof will be omitted. The sixth exemplary embodiment corresponds to the aforementioned second exemplary embodiment.

FIG. 8 is an exploded perspective view of a mobile terminal in accordance with another exemplary embodiment disclosed herein, FIG. 9 is a detailed-exploded perspective view of a part of FIG. 8, and FIG. 10 is a sectional view taken along the lines AA, BB and CC of FIG. 8. Hereinafter, description will be given with reference to FIGS. 8 to 10.

The fifth exemplary embodiment has illustrated that the shorter part of the window 310 is supplemented by the separate members, namely, the supporting members 370, but the sixth exemplary embodiment illustrates that the mold members 415 (i.e., glass-inserted molds) are formed at an end of the window 410 through an insert-injection molding operation. Each of the mold members 415 is formed along a lengthwise direction of the mobile terminal 400. The sixth exemplary embodiment is substantially similar or the same to the fifth exemplary embodiment, except for replacing the supporting member 370 with the mold member 415. Thus, detailed description of he similar configurations will be omitted.

In the sixth exemplary embodiment, a second through hole 445 is formed through a side surface portion 442 of a frame 440 to connect an FPCB 460 and a PCB 450 to each other. The FPCB 460 is electrically connected to the PCB 450 through the second through hole 445. An edge portion 443 protrudes from a lower end of the side surface portion 442 of the frame 440 in a horizontal direction. A third protrusion 481 is formed at an edge of an upper surface of a rear case 480 covering the frame 440 and brought into contact with an inner side of the side surface portion 442 of the frame 440.

That is, the frame 440 in the sixth exemplary embodiment, similar to the fifth exemplary embodiment, includes a front surface portion 441 that faces a front surface of the mobile terminal 400 and has a flat or curved surface, a side surface portion 442 that extends from the front surface portion 441 and is curved toward a side surface of the mobile terminal 400, and an edge portion 443 that outwardly protrudes from the side surface portion 442 in a horizontal direction so as to define a mounting space of the display module 301.

Figure 10C:
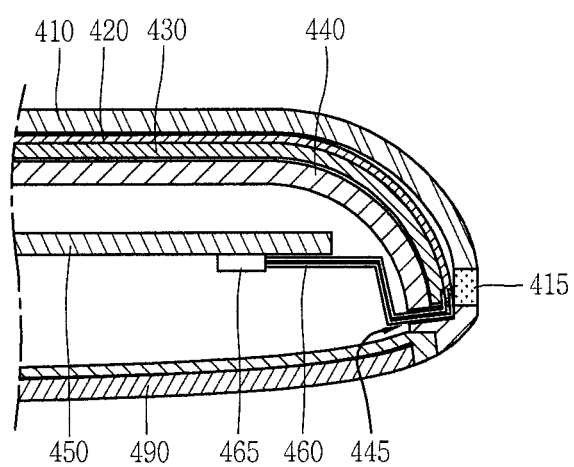

FIG. 10A is a sectional view taken along the line AA of FIG. 8. As illustrated in FIG. 10A, side end portions of the mold member 415, the touch sensor 420 and the display 430 are mounted on the edge portion 443, and the third protrusion 481 allows the frame 440 to be more firmly coupled to the rear case 480. FIG. 10B is a sectional view taken along the line BB of FIG. 8. It can be seen more obviously in FIG. 10B that the mold member 415, the touch sensor 420 and the display 430 are mounted on the edge portion 443 at a portion without the third protrusion 481 formed. FIG. 10C is a sectional view taken along the line CC of FIG. 10. As illustrated in FIG. 10C, the FPCB 460 is connected to ends of the touch sensor 420 and the display 430, and connected to the PCB 450 by a connector 465 through the second through hole 445 formed at the frame 440.

Here, a width of the edge portion 443 is the same as that of a display module 401.

The window 310, 410, the touch sensor 320, 420, the display 330, 430 and the frame 340, 440 may be integrated together so as to be configured as one display module 301, 401.

It should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The aforementioned present disclosure can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising: a body having a front surface and side surfaces; a window on the body, and the window being curved from the front surface toward the side surfaces; a touch sensor on the window, and the touch sensor being curved to correspond to a curved portion of the window; a display on the touch sensor, and the display being curved to correspond to a curved portion of the touch sensor; a frame on the display, and the frame having a shape to correspond to a curved portion of the display; a rear case to cover a portion of the body; and a decoration member at the window, the decoration member including a main surface portion to cover a part of the touch sensor and flush with the window to form the front surface, and curved portions each extending from the main surface portion to cover a part of each of the side surfaces, wherein side surfaces of the touch sensor and the display are longer than side surfaces of the window, and cutout portions are provided by partially cutting out ends of the side surfaces of the touch sensor and the display, respectively, to define a space where the curved portion of the decoration member is curved.

2. The mobile terminal of claim 1, wherein the rear case includes:
accommodating portions at the side surfaces of the touch sensor and the display;
sidewall portions extending from ends of the accommodating portions to contact the window;
a bottom surface portion, traverse to the sidewall portions, and the bottom surface portion being at a higher position than the sidewall portions; and
curved surface portions to connect the sidewall portions to the bottom surface portion.

3. The mobile terminal of claim 2, wherein the sidewall portions of the rear case are along a lengthwise direction of the mobile terminal.

4. The mobile terminal of claim 3, wherein the decoration member is on the bottom surface portion and the curved surface portions of the rear case.

5. The mobile terminal of claim 4, wherein the frame includes:
a front surface portion facing the front surface of the body; and
side surface portions extending from the front surface portion and being curved toward the side surfaces of the body.

6. The mobile terminal of claim 5, further comprising:
first hooks at the main surface portion of the decoration member, and
first holes at the front surface portion of the frame, and the first hooks to be provided into the first holes.

7. The mobile terminal of claim 6, further comprising:
second hooks at the curved portions of the decoration member, and
second holes at the side surface portions of the frame, and the second hooks to be provided into the second holes.

8. The mobile terminal of claim 5, wherein each of the curved portions has a shape corresponds to one of the curved surface portions of the rear case.

9. The mobile terminal of claim 8, wherein each of the cutout portions is to correspond to one of the curved portions and a section from the curved portion to one point of the main surface portion.

10. The mobile terminal of claim 9, wherein the decoration member is on the touch sensor.

11. The mobile terminal of claim 2, wherein the rear case includes a cover portion formed at a side of the accommodating portion to cover the rear surface of the body, and the accommodating portion is more recessed than the cover portion.

12. The mobile terminal of claim 1, further comprising a printed circuit board between the frame and the rear cover.

13. A mobile terminal comprising: a window that is curved from a front surface toward side surfaces; a touch sensor on the window, and the touch sensor being curved at the side surfaces; a display on the touch sensor, and the display being curved at the side surfaces; a frame on the display, and the frame being curved at the side surfaces; a rear case; and a decoration member including a first surface portion and curved portions extending from the first surface portion to cover a part of each of the side surfaces,
- wherein side surfaces of the touch sensor and the display are longer than side surfaces of the window, and cutout portions are at ends of the side surfaces of the touch sensor and the display, respectively;
- wherein the rear case includes: accommodating portions at the side surfaces of the touch sensor and the display; sidewall portions extending from ends of the accommodating portions to contact the window; a bottom surface portion, traverse to the sidewall portions, and the bottom surface portion being at a higher position than the sidewall portions; and curved surface portions to connect the sidewall portions to the bottom surface portion.

14. The mobile terminal of claim 13, wherein the sidewall portions of the rear case are along a lengthwise direction of the mobile terminal.

15. The mobile terminal of claim 13, wherein the frame includes:
- a front surface portion facing the front surface; and
- side surface portions extending from the front surface portion and being curved toward the side surfaces.

16. The mobile terminal of claim 15, further comprising:
- first hooks at the first surface portion of the decoration member, and
- first holes at the front surface portion of the frame, and the first hooks to be provided into the first holes.

17. The mobile terminal of claim 16, further comprising:
- second hooks at the curved portions of the decoration member, and
- second holes at the side surface portions of the frame, and the second hooks to be provided into the second holes.

18. The mobile terminal of claim 15, wherein the curved portions of the decoration member corresponds to the curved surface portions of the rear case.

19. A mobile terminal comprising: a frame being curved at side surfaces of the frame; a display being curved at side surfaces of the display; a touch sensor being curved at side surfaces of the touch sensor; a window being curved at side surfaces of the widow, wherein the touch sensor is between the window and the display, and the display is between the touch sensor and the frame; a rear case; and
- a decoration member having a first surface portion and curved portions extending from the first surface portion to cover a part of each of the side surfaces and flush with the window, wherein side surfaces of the touch sensor and the display are longer than side surfaces of the window, and cutout portions are at ends of the side surfaces of the touch sensor and the display, respectively; and at least one hook extended outwardly at each of the curved portions to be provided into at least one hole at the side surfaces, respectively.

* * * * *